(12) United States Patent
Zhou et al.

(10) Patent No.: US 12,255,721 B2
(45) Date of Patent: Mar. 18, 2025

(54) METHOD PERFORMED BY A BASE STATION, BASE STATION AND COMPUTER-READABLE STORAGE MEDIUM

(71) Applicant: SAMSUNG ELECTRONICS CO., LTD., Suwon-si (KR)

(72) Inventors: Liying Zhou, Beijing (CN); Lei Wang, Beijing (CN); Yiyan Zhang, Beijing (CN); He Wang, Beijing (CN); Songhui Shen, Beijing (CN); Chaeman Lim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 42 days.

(21) Appl. No.: 18/313,568

(22) Filed: May 8, 2023

(65) Prior Publication Data
US 2023/0412239 A1   Dec. 21, 2023

Related U.S. Application Data

(63) Continuation of application No. PCT/KR2023/004945, filed on Apr. 12, 2023.

(30) Foreign Application Priority Data

Jun. 21, 2022 (CN) .......................... 202210706716.8

(51) Int. Cl.
*H04B 7/06* (2006.01)
*H04L 5/00* (2006.01)
(52) U.S. Cl.
CPC ....... *H04B 7/06958* (2023.05); *H04L 5/0048* (2013.01)

(58) Field of Classification Search
CPC .......................... H04B 7/06958; H04L 5/0048
See application file for complete search history.

(56) References Cited

U.S. PATENT DOCUMENTS 10,651,917 B2   5/2020   Wilson et al.
10,944,455 B2   3/2021   Wilson et al.
(Continued)

FOREIGN PATENT DOCUMENTS

| KR | 20200020272 A | 2/2020 | |
|---|---|---|---|
| WO | WO 2020/205802 A1 | 10/2020 | |
| WO | WO-2022029367 A1 * | 2/2022 | ........... H04B 7/0617 |

OTHER PUBLICATIONS

PCT International Search Report dated Jul. 20, 2023 for PCT/KR2023/004945.
(Continued)

*Primary Examiner* — Jaison Joseph
(74) *Attorney, Agent, or Firm* — Nixon & Vanderhye P.C.

(57) ABSTRACT

A method which may be performed by a base station, may include obtaining a predicted transmission configuration indicator (TCI) subset for a user equipment (UE); and determining the TCI subset corresponding to the UE based on the predicted TCI subset. The step of obtaining the predicted TCI subset in the solution may be implemented by using a trained artificial intelligence model. Since the beams in the predicted TCI subset may fit the movement trend of the UE, then the target serving beam for the UE when performing serving beam switching may belong to the predicted TCI subset with a greater possibility, thus reducing the occurrence of high delay scenarios when the UE performs the serving beam switching, and thus reducing the beam switching delay.

20 Claims, 20 Drawing Sheets

(56) References Cited

U.S. PATENT DOCUMENTS

| | | | |
|---|---|---|---|
| 11,201,663 | B2 | 12/2021 | Zhou et al. |
| 11,252,731 | B1* | 2/2022 | Levitsky ................. G01S 11/04 |
| 11,930,375 | B2 | 3/2024 | Zhu et al. |
| 2019/0222289 | A1 | 7/2019 | Wilson et al. |
| 2019/0334603 | A1 | 10/2019 | Venugopal et al. |
| 2021/0029707 | A1 | 1/2021 | Xu et al. |
| 2021/0314927 | A1 | 10/2021 | Noh et al. |
| 2021/0337525 | A1 | 10/2021 | Rahman et al. |
| 2022/0200675 | A1 | 6/2022 | Raghavan et al. |
| 2023/0412239 | A1* | 12/2023 | Zhou .................... H04B 7/0695 |

OTHER PUBLICATIONS

PCT Written Opinion dated Jul. 20, 2023 for PCT/KR2023/004945.

R4 2208845; Electronic Meeting, May 9-May 20, 2022; "Discussion on Remaining Issues on Timing Requirements for FR2 HST" 3GPP TSG-RAN WG4 Meeting #103-e.

3rd Generation Partnership Project; Technical Specification Group Radio Access Network; NR; RadioResource Control (RRC) protocol specification (Release 17) 3GPP TS 38.331 V17.7.0 (Dec. 2023).

3rd Generation Partnership Project; Technical Specification Group Radio Access Network; NR; Requirements for support of radio resource management (Release 17).

Annex A: (normative): Test Cases 3GPP TS 38.133 V17.4.0 (Dec. 2021).

A.6 Nr Standalone tests with all NR cells in FR1.

Annex B (Normative) Conditions for RRM requirements applicability for operating bands; 3GPP TS 38.133 V17.4.0 (Dec. 2021.

Forward—Technical Specification has been produced by the 3rd Generation Partnership Project (3GPP).

* cited by examiner

METHOD PERFORMED BY A BASE STATION, BASE STATION AND COMPUTER-READABLE STORAGE MEDIUM

This application is a continuation application of international application No. PCT/KR2023/004945, filed on Apr. 12, 2023, which is based on and claims the benefit of Chinese application number 202210706716.8 filed on Jun. 21, 2022, the disclosure of each of which is incorporated by reference herein in its entirety.

BACKGROUND

Field

Certain example embodiments relate to wireless communication technologies, and for example, to a method performed by a base station, a base station, and a computer readable storage medium.

Description of Related Art

In a millimeter wave communication system, a base station (BS) may configure multiple levels of sets for beam management and beam tracking, including a full beam set, a transmission configuration indicator-state (TCI-state) configured beam set (referred to as Subset_tci), and an active TCI state beam set (referred to as Subset_active). The Subset_tci and the Subset_active may be referred collectively as TCI subset, both of which have limited size. Due to the mobility of user equipment (UE), the serving beam for a UE may be switched. The switching delay is different when the serving beam is switched to one of the different sets mentioned above. The corresponding switching delay varies considerably in different beam switching scenarios. However, in the 5G era, more and more services are sensitive to delay, such as AR/VR (typical delay requirement of 20 milliseconds (ms)), autonomous driving/V2X (typical delay requirement of 10 ms), and cloud gaming (typical delay requirement of ms level).

SUMMARY

It is desirable to propose a new beam management method in order to reduce the delay in the beam switching procedure and meet the requirements of the above services.

Certain example embodiment(s) solve at least one of the above-mentioned problems.

An example embodiment may provide a method to be performed by a base station, and the method may include:
  obtaining a predicted transmission configuration indicator (TCI) subset for a user equipment (UE); and
  determining a TCI subset corresponding to the UE based on the predicted TCI subset.

The obtaining a predicted TCI subset for a UE, may include at least one of the following:
  obtaining the predicted TCI subset for the UE according to a set prediction period; and
  obtaining the predicted TCI subset for the UE based on a current TCI subset for the UE.

The obtaining the predicted TCI subset for the UE based on a current TCI subset for the UE, may include:
  obtaining the predicted TCI subset for the UE if the current TCI subset for the UE meets a first preset condition;

wherein the current TCI subset meets a first preset condition, may include at least one of the following:
  a number of beams that had been used as serving beams for the UE in the current TCI subset is not less than a first preset number;
  a switching probability corresponding to a current corresponding serving beam for the UE in a last TCI subset prediction result is not greater than a first preset threshold; and
  a switching distance between the current corresponding serving beam for the UE and a corresponding serving beam at the time of a last TCI subset update is not less than a first preset distance.

The obtaining a predicted TCI subset for a UE may include:
  obtaining the predicted TCI subset for the UE based on historical measurement report information reported by the UE.

The obtaining the predicted TCI subset for the UE based on historical measurement report information reported by the UE, may include:
  determining a switching probability corresponding to each beam in a full beam set based on the historical measurement report information reported by the UE; and
  determining the predicted TCI subset from the full beam set based on the switching probabilities.

The determining a switching probability corresponding to each beam in a full beam set based on the historical measurement report information reported by the UE, may include:
  determining, using at least a prediction model, the switching probability corresponding to each beam in the full beam set based on the historical measurement report information reported by the UE.

The determining, using a prediction model, the switching probability corresponding to each beam in the full beam set based on the historical measurement report information reported by the UE, may include:
  sampling the historical measurement report information in a preset way to obtain measurement values of each sample beam corresponding to each sampling in the historical measurement report information; and
  determining, using the prediction model, the switching probability corresponding to each beam in the full beam set based on the measurement values of each sample beam.

The determining, using the prediction model, the switching probability corresponding to each beam in the full beam set based on the measurement values of each sample beam, may include:
  obtaining at least one of a vertical orientation angle, a horizontal orientation angle, a beam width, and a beam vector of each sample beam, wherein the beam vector characterizes distribution information of the beams and switching information among the beams; and
  determining, using the prediction model, the switching probability corresponding to each beam in the full beam set based on at least one of the obtained vertical orientation angle, the horizontal orientation angle, the beam width, and the beam vector, as well as the measurement values of each sample beam.

The sampling the historical measurement report information in a preset way, may include at least one of the following:
  sampling the historical measurement report information once every preset time interval;

performing the sampling once when a corresponding designated beam for the UE changes for a preset number of times; and performing the sampling once when the switching distance between the corresponding serving beam for the UE and a corresponding serving beam at last sampling is not less than a second preset distance.

The determining the predicted TCI subset from the full beam set based on the switching probabilities, may include:

determining, based on capability information of the UE, a second preset number of beams with the highest switching probability in the full beam set to be the beams in the predicted TCI subset.

The first preset number may be determined based on size of the TCI subset corresponding to the UE.

The first preset threshold may be determined based on the switching probabilities corresponding to at least one designated beam in the last TCI subset prediction result.

The designated beam may be a third preset number of beams with the highest switching probability in the last TCI subset prediction result or a beam with a switching probability arranged at a preset sequence order in the last TCI subset prediction result.

The first preset distance may be determined based on the switching distance between each beam in the current TCI subset for the UE and the corresponding serving beam at the time of the last TCI subset update.

The switching distance may be a degree of similarity between a beam vector of each beam in the current TCI subset and a beam vector of the corresponding serving beam at the time of the last TCI subset update.

The determining the TCI subset corresponding to the UE based on the predicted TCI subset, may include:

updating the current TCI subset based on the predicted TCI subset, based on a degree of difference between the current TCI subset and the predicted TCI subset for the UE.

The updating the current TCI subset based on the predicted TCI subset, based on a degree of difference between the current TCI subset and the predicted TCI subset for the UE, may include:

updating the current TCI subset based on the predicted TCI subset if the degree of difference between the current TCI subset and the predicted TCI subset meets a second preset condition;

the second preset condition may include at least one of the following:

an occupancy proportion of beams in the current TCI subset that are identical to beams in the predicted TCI subset to the predicted TCI subset is not greater than a second preset threshold; and a ratio of the sum of the switching probabilities corresponding to all beams in the current TCI subset to the sum of the switching probabilities corresponding to all beams in the predicted TCI subset is not greater than a third preset threshold.

An example embodiment may provide a beam management apparatus which includes:

a TCI subset prediction module (comprising processing circuitry) configured for obtaining a predicted transmission configuration indicator (TCI) subset for a user equipment (UE); and a TCI subset update module (comprising processing circuitry) configured for determining a TCI subset corresponding to the UE based on the predicted TCI subset.

The TCI subset prediction module may be configured for:
obtaining the predicted TCI subset for the UE according to a set prediction period; and
obtaining the predicted TCI subset for the UE based on a current TCI subset for the UE.

The TCI subset prediction module may be configured for:
obtaining the predicted TCI subset for the UE if the current TCI subset for the UE meets a first preset condition;
wherein the current TCI subset meets a first preset condition, may include at least one of the following:
a number of beams that had been used as serving beams for the UE in the current TCI subset is not less than a first preset number;
a switching probability corresponding to a current corresponding serving beam for the UE in a last TCI subset prediction result is not greater than a first preset threshold; and
a switching distance between the current corresponding serving beam for the UE and a corresponding serving beam at the time of a last TCI subset update is not less than a first preset distance.

The TCI subset prediction module may be configured for:
obtaining the predicted TCI subset for the UE based on historical measurement report information reported by the UE.

The TCI subset prediction module may be configured for:
determining a switching probability corresponding to each beam in a full beam set based on the historical measurement report information reported by the UE; and
determining the predicted TCI subset from the full beam set based on the switching probabilities.

The TCI subset prediction module may be further configured for:
determining, using a prediction model, the switching probability corresponding to each beam in the full beam set based on the historical measurement report information reported by the UE.

The TCI subset prediction module may be configured for:
sampling the historical measurement report information in a preset way to obtain measurement values of each sample beam corresponding to each sampling in the historical measurement report information; and
determining, using the prediction model, the switching probability corresponding to each beam in the full beam set based on the measurement values of each sample beam.

The TCI subset prediction module may be configured for:
obtaining at least one of a vertical orientation angle, a horizontal orientation angle, a beam width, and a beam vector of each sample beam, wherein the beam vector characterizes distribution information of the beams and switching information among the beams; and
determining, using the prediction model, the switching probability corresponding to each beam in the full beam set based on at least one of the obtained vertical orientation angle, the horizontal orientation angle, the beam width, and the beam vector, as well as the measurement values of each sample beam.

The TCI subset prediction module may be configured for at least one of the following:
sampling the historical measurement report information once every preset time interval;
performing the sampling once when a corresponding designated beam for the UE changes for a preset number of times; and performing the sampling once when the switching distance between the corresponding serving beam for the UE and a corresponding serving beam at last sampling is not less than a second preset distance.

The TCI subset prediction module may be configured for: determining, based on capability information of the UE, a second preset number of beams with the highest switching probability in the full beam set to be the beams in the predicted TCI subset.

The first preset number may be determined based on size of the TCI subset corresponding to the UE.

In an optional embodiment of the present application, the first preset threshold may be determined based on the switching probabilities corresponding to at least one designated beam in the last TCI subset prediction result.

The designated beam may be a third preset number of beams with the highest switching probability in the last TCI subset prediction result and/or a beam with a switching probability arranged at a preset sequence order in the last TCI subset prediction result.

The first preset distance may be determined based on the switching distance between each beam in the current TCI subset for the UE and the corresponding serving beam at the time of the last TCI subset update.

The switching distance may be a degree of similarity between a beam vector of each beam in the current TCI subset and a beam vector of the corresponding serving beam at the time of the last TCI subset update.

The TCI subset prediction module may be configured for: updating the current TCI subset based on the predicted TCI subset, based on a degree of difference between the current TCI subset and the predicted TCI subset for the UE.

The TCI subset prediction module may be configured for: updating the current TCI subset based on the predicted TCI subset if the degree of difference between the current TCI subset and the predicted TCI subset meets a second preset condition;

the second preset condition may include at least one of the following:
an occupancy proportion of beams in the current TCI subset that are identical to beams in the predicted TCI subset to the predicted TCI subset is not greater than a second preset threshold; and
a ratio of the sum of the switching probabilities corresponding to all beams in the current TCI subset to the sum of the switching probabilities corresponding to all beams in the predicted TCI subset is not greater than a third preset threshold.

An example embodiment may provide a base station, where the base station includes a memory and a processor; wherein the memory has computer programs stored therein; and
the processor may be configured to execute the computer programs to implement the method provided in any embodiment(s) herein.

An example embodiment may provide a computer readable storage medium having computer programs stored thereon. The computer programs, when executed by the processor, may implement any method provided herein.

Example beneficial effect(s) brought about by the technical solution provided by the present application may include:
a predicted TCI subset fitting the movement trend of the UE may be configured according to the beam switching situation of the UE, and the current TCI subset may be replaced with the predicted TCI subset in a timely manner based on the degree of difference between the current TCI subset and the predicted TCI subset. Since the beams in the predicted TCI subset fit the movement trend of the UE, then the target serving beam for the UE when performing serving beam switching will belong to the predicted TCI subset with a greater possibility, thus reducing the occurrence of high delay scenarios when the UE performs the serving beam switching, and thus reducing the beam switching delay.

BRIEF DESCRIPTION OF THE DRAWINGS

The above and other aspects, features, and advantages of certain embodiments of the disclosure will be more apparent from the following description taken in conjunction with the accompanying drawings, in which.

DETAILED DESCRIPTION

Figure 1A:
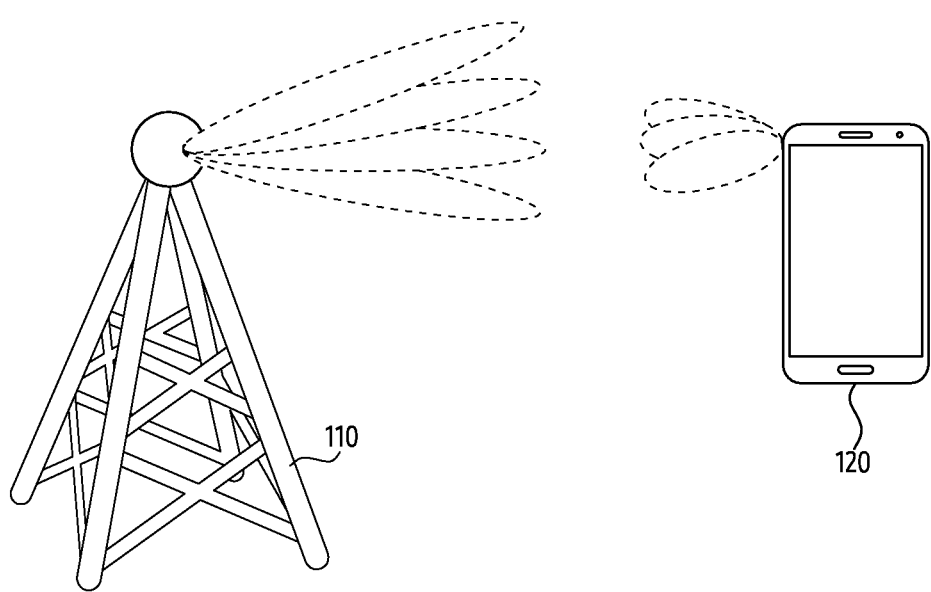
FIG. 1A illustrates a wireless communication system according to an embodiment of the disclosure.

Example embodiments are described in detail hereinafter. Examples are illustrated in the drawings; wherein identical or similar reference numbers indicate identical or similar elements or elements having identical or similar functions throughout. Embodiments described with reference to the accompanying drawings are exemplary, and are only for explaining the present application instead of being construed as limitations.

An ordinary person skilled in the art may understand that "a", "an", "said" and "this" may also refer to plural nouns, unless otherwise specifically stated. It should be further understood that terms "include/including" used in this specification specify the presence of the stated features, integers, steps, operations, elements and/or components, but not exclusive of the presence or addition of one or more other features, integers, steps, operations, elements, components, and/or combinations thereof. It will be understood that when an element is referred to as being "connected" or "coupled" to another element, it can be directly connected or coupled to the other element or intervening element(s) may be present. Further, "connection" or "coupling" used herein may include wireless connection or wireless coupling. As used herein, term "and/or" includes all or any of one or more associated listed items or combinations thereof.

In order to make the objectives, technical solutions and advantages of the present application clearer, example embodiments will be further described in detail below in combination with the accompanying drawings.

FIG. 1A illustrates a wireless communication system according to an embodiment of the disclosure.

Referring to FIG. 1A, it illustrates a base station 110 and a terminal 120 as parts of nodes using a wireless channel in a wireless communication system. Although FIG. 1A illustrates only one base station, the wireless communication system may further include another base station that is the same as or similar to the base station 110.

The base station 110 is a network infrastructure that provides wireless access to the terminal 120. The base station 110 may have a coverage defined based on a distance capable of transmitting a signal. In addition to the term 'base station', the base station 110 may be referred to as 'access point (AP)', 'eNodeB (eNB)', '5th generation node', 'next generation nodeB (gNB)', 'wireless point', 'transmission/reception', or other terms having the same or equivalent meaning thereto.

The terminal 120, which is a device used by a user, performs communications with the base station 110 through a wireless channel. A link from the base station 110 to the terminal 120 is referred to as a downlink (DL), and a link from the terminal 120 to the base station 110 is referred to as an uplink (UL). Further, although not shown in FIG. 1A, the terminal 120 and other terminals may perform communications with each other through the wireless channel. In this context, a link between the terminal 120 and another terminals (device-to-device link, D2D) is referred to as a side link, and the side link may be used mixed with a PC5 interface. In some other embodiments of the disclosure, the terminal 120 may be operated without any user's involvement. According to an embodiment of the disclosure, the terminal 120 is a device that performs machine-type communication (MTC) and may not be carried by a user. In addition, according to an embodiment of the disclosure, the terminal 120 may be a narrowband (NB)-Internet of things (IoT) device.

The terminal 120 may be referred to as 'user equipment (UE), 'customer premises equipment (CPE), 'mobile station', 'subscriber station', 'remote terminal', 'wireless terminal', 'electronic device', 'user device', or any other term having the same or equivalent technical meaning thereto.

The base station 110 may perform beamforming with the terminal 120. The base station 110 and the terminal 120 may transmit and receive radio signals in a relatively low frequency band (e.g., FR 1 (frequency range 1) of NR). Further, the base station 110 and the terminal 120 may transmit and receive radio signals in a relatively high frequency band (e.g., FR 2 of NR (or FR 2-1, FR 2-2, FR 2-3), FR 3, or millimeter wave (mmWave) bands (e.g., 28 GHz, 30 GHz, 38 GHz, 60 GHz)). In order to improve the channel gain, the base station 110 and the terminal 120 may perform beamforming. In this context, the beamforming may include transmission beamforming and reception beamforming. The base station 110 and the terminal 120 may assign directionality to a transmission signal or a reception signal. To that end, the base station 110 and the terminal 120 may select serving beams through a beam search or beam management procedure. After the serving beams are selected, subsequent communication may be performed through a resource having a quasi-co located (QCL) relationship with a resource that has transmitted the serving beams.

A first antenna port and a second antenna port may be evaluated to be in such a QCL relationship, if the wide-scale characteristics of a channel carrying symbols on the first antenna port can be estimated from a channel carrying symbols on the second antenna port. For example, the wide-scale characteristics may include at least one of delay spread, Doppler spread, Doppler shift, average gain, average delay, and spatial receiver parameters.

Although in FIG. 1A, both the base station 110 and the terminal 120 are described as performing beamforming, embodiments of the disclosure are not necessarily limited thereto. In some embodiments of the disclosure, the terminal may or may not perform beamforming. Likewise, the base station may or may not perform beamforming. That is to say, only either one of the base station and the terminal may perform beamforming, or both the base station and the terminal may not perform beamforming.

In the disclosure, a beam means a spatial flow of a signal in a radio channel, and may be formed by one or more antennas (or antenna elements), of which formation process may be referred to as beamforming. The beamforming may include at least one of analog beamforming and digital beamforming (e.g., precoding). Reference signals transmitted based on beamforming may include, for example, a demodulation-reference signal (DM-RS), a channel state information-reference signal (CSI-RS), a synchronization signal/physical broadcast channel (SS/PBCH), or a sounding reference signal (SRS). Further, for a configuration for each reference signal, an IE, such as a CSI-RS resource, an SRS-resource, or the like may be used, and the configuration may include information associated with a beam. Beam-associated information may refer to whether a corresponding configuration (e.g., CSI-RS resource) uses the same spatial domain filter as other configuration (e.g., another CSI-RS resource within the same CSI-RS resource set) or uses a different spatial domain filter, or with which reference signal is QCL, or if QCLed, what type (e.g., QCL type A, B, C, or D) it has.

According to the related art, in a communication system with a relatively large cell radius of a base station, each base station was installed so that the respective base station includes functions of a digital processing unit (or distributed unit (DU)) and a radio frequency (RF) processing unit (or radio unit (RU)). However, as high-frequency bands are used in 4th generation (4G) systems and/or its subsequent communication systems (e.g., fifth-generation (5G), and the cell coverage of a base station decreased, the number of base stations to cover a certain area has increased. Thus, it led to more increased burden of initial installation costs for communication providers to install more base stations. In order to reduce the installation costs of the base station, as an example of the implementation, the structure in which the DU and the RU of the base station are separated may be proposed so that one or more RUs are connected to one DU through a wired network and one or more RUs geographically distributed are arranged to cover a specific area.

Hereinafter, for the utilization of the TCI subset with beams, the definition of TCI state is described first. In the 3GPP specification, the TCI state is defined. The TCI state is configured to the UE by the base station. The TCI state associates one or two downlink (DL) reference signals (RSs) with a corresponding quasi-colocation (QCL) type. The TCI state comprises QCL type information, called as 'qcl-Type1'. For example, the QCL type information includes RS information which is one of identification information of a channel state information (CSI)-RS resource and an index of a synchronization signal/physical broadcast channel (SS/PBCH block) (SSB). For example, the QCL type information includes information indicating a QCL type which is one of type A, type B, type C, and type D. The QCL type defines a large scale properties for a target RS and one RS indicated by the RS information. the large scale properties for the one RS can be applied to the large scale properties for the target RS as the same way. As the QCL type A, the large scale properties comprises Doppler shift, Doppler spread, average delay, and delay spread. As the QCL type A, the large scale properties comprises Doppler shift and Doppler spread. As the QCL type A, the large scale properties comprises Doppler shift and average delay. As the QCL type D, the large scale properties comprises the Spatial Rx parameters. For example, the QCL type information includes cell information for indicating the serving cell index. For example, the QCL type information includes bandwidth part (BWP) information for indicating a DL BWP which the RS is located in. Further, the TCI state comprises additional QCL type information, called as 'qcl-Type2'. The additional QCL type information has the same format with the QCL type information.

The TCI states are dynamically sent over in a DCI message which includes configurations such as quasi co-location relationships between the downlink (DL) reference signals (RSs) in one CSI-RS set (or SSB) and the PDSCH/PDCCH DMRS ports. The UE can be configured with a list of up to "M" TCI-State configurations within the higher layer (e.g., RRC message) parameter. The M depends on the UE capability maxNumberActiveTCI-PerBWP. Each TCI-State contains parameters for configuring a quasi co-location relationship between one or two DL RSs and the DM-RS ports of the PDSCH, the DM-RS port of PDCCH or the CSI-RS port(s) of a CSI-RS resource.

Figure 1B:
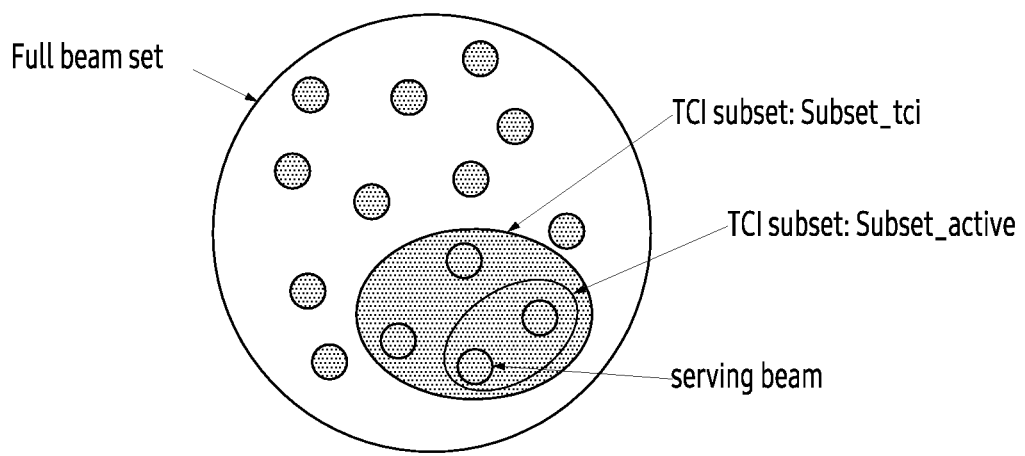
FIG. 1B is a schematic diagram of the inclusion relationship between a full beam set and TCI subsets in an example embodiment.

As shown in FIG. 1B, the structures of the above-mentioned various sets are as follows:

Full beam set: in particular, the full beam set is based on implementation, and for a BS (e.g., the base station 110), this set is a set of all beam that can be physically achievable. Each beam may have a corresponding reference signal (e.g., synchronization signal block (SSB) or channel state information-reference signal (CSI-RS)). User equipment (UE) measuring a beam may indicate measuring a corresponding reference signal.

A transmission configuration indicator-state (TCI-state) configured beam set: the beams need to be configured with TCI-states in order to use the beams or to obtain further channel information about the beams. This set is indicated by radio resource control (RRC) signaling and is a subset of the full beam set. For example, for an SSB-based beam, a TCI-state may be configured for this beam and a tracking reference signal is associated with this beam. On one hand, the UE can know the beam information for transmitting the tracking reference signal (TRS) via the TCI-state; on the other hand, the UE can obtain the time-frequency synchronization information of this beam via TRS. Hereinafter, the Subset_tci is used to refer to this subset.

An active TCI state beam set: e.g., the candidate set of serving beams, indicated by the medium access control control element (MAC CE), is a subset of the Subset_tci. For the beam within this set, the UE needs to keep performing tracking and time-frequency synchronization. Hereinafter, Subset_active is used to refer to this subset.

Physical Downlink Shared Channel (PDCCH)/Physical Downlink Shared Channel (PDSCH) beam: e.g., the actual serving beam for the UE, which is indicated by MAC CE or Downlink Control Information (DCI) and is one beam in the Subset_active.

Hereinafter, the TCI subset is used to refer to the Subset_tci and the Subset_active.

The Subset_tci and the Subset_active are limited in size, which are of the possible values in mmWave band as shown in table 1.

TABLE 1

| TCI subset | the size of the subset (possible values according to different UE capabilities) |
|---|---|
| Subset_active | {1, 2, 4, 8} |
| Subset_tci | {64, 128} |

Due to the mobility of the UEs, the serving beam for a UE may be switched. The switching delay is different when the serving beam is switched to one of the different sets mentioned above. Specifically, there are four switching scenarios.

Scenario #1: the target serving beam to be switched to is the current serving beam, and no beam switching will take place.

Scenario #2: the target serving beam to be switched to is not the current serving beam and the target serving beam is in the Subset_active, the BS 110 directly indicates the target serving beam via a MAC-CE or DCI.

Scenario #3: the target serving beam to be switched to is not the current serving beam and the target serving beam is not in the Subset_active but in the Subset_tci. At this time, in addition to indicating the target serving beam, the BS 110 needs to update the Subset_active via the MAC-CE to include the target serving beam therein.

Scenario #4: the target serving beam the current serving beam, and the target serving beam is not in the Subset_tci. At this time, the BS 110 firstly updates the Subset_tci via a RRC signaling and then updates the Subset_active via the MAC-CE, so that each of these two sets includes the target serving beam. (e.g., the scenario #4 is changed into the scenario #3, and then the operations under the scenario #3 are performed).

The switching delay mainly concerned in the beam switching procedure includes a system processing delay $T_D$ and a transmission interruption delay $T_I$. Specifically, the system processing delay $T_D$ is from "the reporting of the last UE measurement when the switching is triggered" to "successful decoding of a serving beam switching indication from the BS 110 by the UE". During this period, the serving beam for the UE is not an optimal beam. Whenever the beam switching occurs, $T_D$ is inevitable, but the duration of $T_D$ varies with the switching scenario. The transmission interruption delay $T_I$ is used by the UE to measure the target serving beam and perform the time-frequency synchronization. In the related art, the BS 110 shall not expect the UE to receive any PDCCHs or PDSCHs for this period, e.g., the data transmission is interrupted. As the switching scenario is different, $T_I$ is also different. The switching delays corresponding to the above four scenarios are shown in table 2.

TABLE 2

| scenario | $T_D$ | | $T_I$ | | $T_D + T_I$ (Assuming that 120 kHz SCS) |
|---|---|---|---|---|---|
| | $T_{gNB\_processing}$ | $T_{HARQ+3ms}$ | $T_{first-SSB}$ | $T_{SSB-proc}$ | |
| #1 | — | — | — | — | (no switching) |
| #2 | 1 slot | 8 slots + 3 ms | 0 | 0 | 33 slots (4.125 ms) |
| #3 | 1 slot | 8 slots + 3 ms | 10 ms | 2 ms | 129 slots (16.125 ms) |
| #4 | 10 ms | 8 slots + 3 ms | 10 ms | 2 ms | 208 slots (26 ms) |

The above table makes comparison among the switching delays ($T_D$ and $T_I$) of the four switching scenarios, the values are derived according to definitions or typical configurations. As can be seen, with respect to the beam switching delay, the switching scenario #4>the switching scenario #3>the switching scenario #2>the switching scenario #1. Specifically speaking, the scenario #3 has one more interruption delay $T_I$ than the scenario #2 in terms of the delay, because the target serving beam of the scenario #3 is not in the Subset_active, the UE needs to perform one additional measurement on the SSB of the target beam for time-frequency synchronization; the $T_{first-SSB}$ is the time the UE waits for the SSB of this beam, here half of a typical SSB period (20 ms) is taken as an average. $T_{SSB-proc}$ is the time when the UE completed the time-frequency synchronization, which is specified as 2 ms. The scenario #4 is based on the scenario #3 and has a longer $T_D$, because the target serving beam of the scenario #4 is not in the Subset_tci, the BS 110 needs to first update the Subset_tci via the RRC signaling to include the target serving beam therein, and then perform the same operations as scenario #3. The delay for the flow of reconfiguring the Subset_tci via the RRC may be 10 ms.

As can be seen, there exist very large difference among the switching delays of the scenario #2, the scenario #3, and the scenario #4. However, in the era, more and more services are sensitive to the delays, such as AR/VR (typical delay requirement of 20 ms), autonomous driving/V2X (typical delay requirement of 10 ms), and cloud gaming (typical delay requirement of ms level). If the switch between the scenario #3 and the scenario #4 occurs frequently, it may frequently introduce transmission interruption ($T_I$) or extend the time ($T_D$) in which the non-optimal beam serves, which would affect user experience, especially when the user is in a high-speed moving state. Therefore, an embodiment provides a beam management method.

Figure 2:
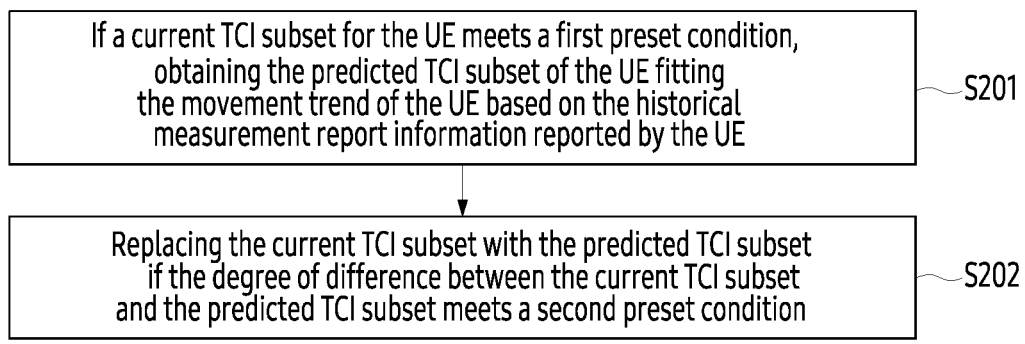
FIG. 2 is a schematic diagram of a flow for beam management method according to an embodiment.

FIG. 2 is a schematic diagram of a flow for beam management method provided by an embodiment, the performing entity of the method may be a base station 110 in a wireless communication system. As shown in FIG. 2, the method may include:

In the operation S201, the base station 110 obtains a predicted transmission configuration indicator (TCI) subset for a user equipment (UE).

Specifically, the base station 110 performs a TCI subset prediction to obtain the predicted TCI subset fitting the movement trend of the UE. In this way, the target serving beam that the UE is switching to when performing the serving beam switching may belong to the predicted TCI subset as much as possible.

Further, the obtaining a predicted TCI subset for a UE, includes at least one of the following:

obtaining the predicted TCI subset for the UE according to a preset prediction period; and obtaining the predicted TCI subset for the UE based on a current TCI subset for the UE.

Specifically, on one hand, the base station 110 can perform the TCI subset prediction periodically, e.g., obtain the predicted TCI subset for the UE according to a preset prediction period which may be set according to the actual requirements. On the other hand, the base station 110 can determine whether to perform the TCI subset prediction according to the duration and accuracy of the current subset for the UE. Specifically, the base station 110 first analyzes the duration and accuracy of the current TCI subset based on the switching situation of the serving beam for the UE. If the duration and accuracy of the current TCI subset meet the first preset condition, the target serving beam to which the UE is switching when it performs the serving beam switching may not belong to the current TCI subset with a certain possibility, e.g., scenarios #3 and #4 may occur. In order to avoid the scenario #3 and the scenario #4, the base station 110 performs a TCI subset prediction and obtains a predicted TCI subset fitting the movement trend of the UE. The details of the first preset condition will be described in detail later.

In the operation S202, a TCI subset corresponding to the UE is determined based on the predicted TCI subset.

Specifically, after the predicted TCI subset has been obtained in the previous step, the updating of the TCI subset for the UE can be performed, e.g., the TCI subset corresponding to the UE is determined. The base station 110 updates the TCI subset for the UE.

Further, the determining the TCI subset corresponding to the UE based on the predicted TCI subset, includes:

updating the current TCI subset based on the predicted TCI subset, based on a degree of difference between the current TCI subset and the predicted TCI subset for the UE.

Specifically, comparing the current TCI subset with the predicted TCI subset, if the degree of difference between the two is greater, it is further indicated that the target serving beam to which the UE is to switch to when performing the serving beam switching may not belong to the current TCI subset with greater possibility. Therefore, in order to avoid the scenario #3 and the scenario #4 when the UE performs the serving beam switching, the current TCI subset can be replaced with the predicted TCI subset, e.g., the predicted TCI subset is configured for the UE as a new TCI subset for the UE to perform the serving beam switching. This step can be understood as performing the updating of the TCI subset when the degree of difference between the current TCI subset and the predicted TCI subset meets a second preset condition. The details of the second preset condition will be described in more detail later.

According to the solution provided by the present application, a predicted TCI subset fitting the movement trend of the UE is configured according to the beam switching situation of the UE, and the current TCI subset is replaced with the predicted TCI subset in a timely manner based on the degree of difference between the current TCI subset and the predicted TCI subset. Since the beams in the predicted TCI subset fit the movement trend of the UE, then the target serving beam for the UE when performing serving beam switching will belong to the predicted TCI subset with a greater possibility, thus reducing the occurrence of high delay scenarios (e.g., the scenario #3 and the scenario #4) when the UE performs the serving beam switching, and thus reducing the beam switching delay.

Figure 3:
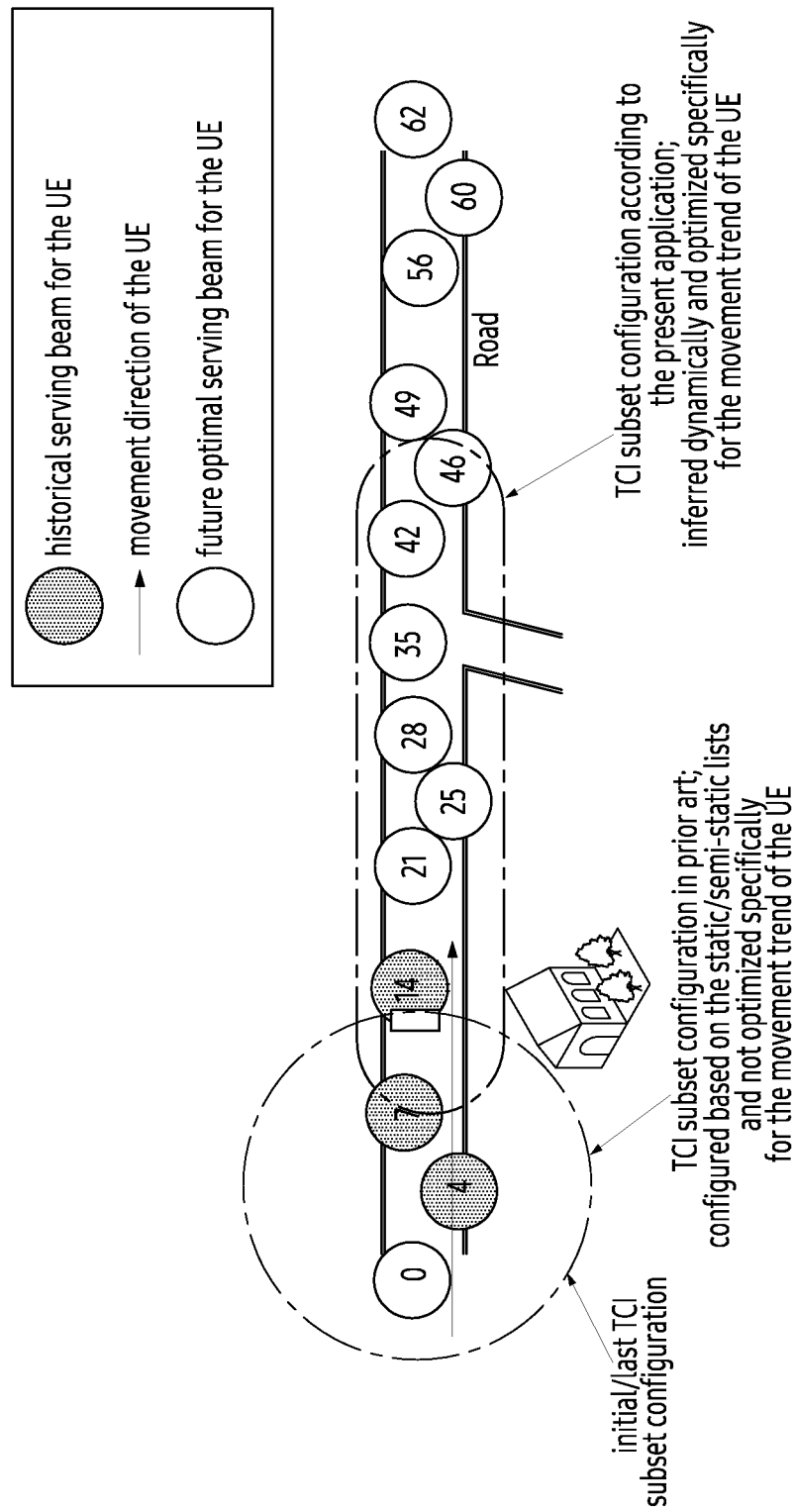
FIG. 3 is a schematic diagram of a TCI subset prediction and a TCI subset replacement in an example embodiment.

As shown in FIG. 3, the direction of movement of the UE (e.g., its movement trend) is provided, and the UE moves to the right along the road, the serving beam will switch from beam 7 to beam 14. Before the serving beam for the UE is switched to beam 14, e.g., when the serving beam for the UE is switched to beam 7, a base station (BS) (e.g., the base station 110) according to the certain example embodiments obtains a predicted TCI subset fitting the movement trend of the UE in advance. The BS 110 determines that the configuration of the current TCI subset is no longer suitable for movement trend of the UE and triggers a configuration update of the TCI subset in advance. When the serving beam is to be switched to beam 14 while the UE is moving, the beam 14 is already included in the TCI subset, thus avoiding the occurrence of the scenarios #3 or #4 when the UE performs the serving beam switching, and thus reducing the beam switching delay.

Figure 4:
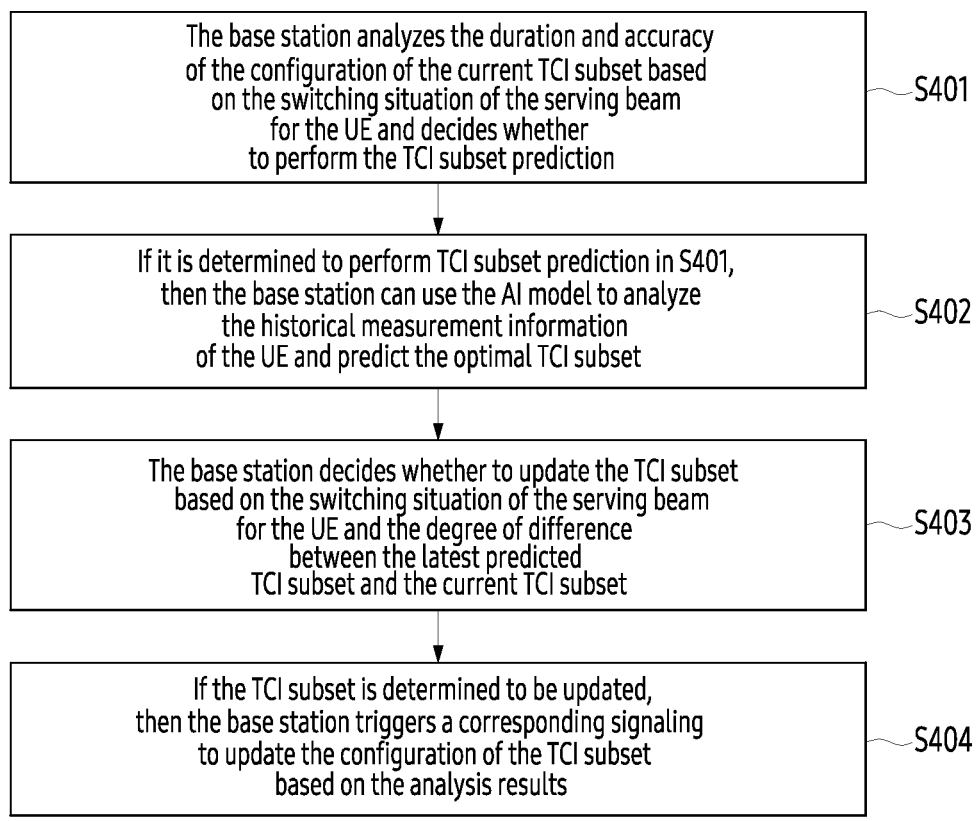
FIG. 4 is a specific schematic diagram of an implementation of a flow for beam management scheme in an example embodiment.

Further, as shown in FIG. 4, the beam management scheme provided by the embodiment may more specifically include the following steps:

In the operation S401, the base station 110 analyzes the duration and accuracy of the configuration of the current TCI subset based on the switching situation of the serving beam for the UE and decides whether to perform the TCI subset prediction.

In the operation S402, if the TCI subset prediction is determined to be performed in S401, then the base station 110 may analyze the historical measurement report information for the UE by using an artificial intelligence (AI) model to and predict the optimal TCI subset, e.g., the predicted TCI subset.

In the operation S403, the base station decides whether to update the TCI subset based on the switching situation of the serving beam for the UE and the degree of difference between the latest predicted TCI subset and the current TCI subset.

In the operation S404, if the TCI subset is determined to be updated in S403, then the base station 110 triggers a corresponding signaling to update the configuration of the TCI subset based on the analysis results.

Specifically, S401 is intended to achieve a balance between computation cost and effectiveness. That is, more frequent AI predictions allow for a more timely determination of whether the current TCI subset state of the UE is still compliance with the movement trend of the UE, but this also indicates a greater computational overhead. S401 attempts to monitor whether the current TCI subset state of the UE is out of date (e.g., whether it fits the movement trend of the UE) with a controlled/adjustable computational overhead.

S403 is intended to achieve a balance between signaling overhead and effectiveness. That is, more frequent updates to the configuration of the TCI subset have a greater possibility of avoiding (or even eliminating) the scenarios #3 and #4, but this also may indicate a greater signaling overhead. S403 attempts to achieve the desired performance with a controlled/adjustable signaling overhead.

Each of the steps is described in detail below.

The process of obtaining a predicted TCI subset (e.g., the TCI subset prediction process) is first described. In an optional embodiment, the obtaining a predicted TCI subset of a UE, includes obtaining the predicted TCI subset of the UE based on the historical measurement report information reported by the UE.

Further, the obtaining the predicted TCI subset of the UE based on the historical measurement report information reported by the UE, includes determining a switching probability corresponding to each beam in a full beam set based on the historical measurement report information reported by the UE and determining the predicted TCI subset from among the full beam set based on the switching probabilities.

The determining a switching probability corresponding to each beam in a full beam set based on the historical measurement report information reported by the UE, includes determining, using a prediction model, the switching probability corresponding to each beam in the full beam set based on the historical measurement report information reported by the UE.

Figure 5:
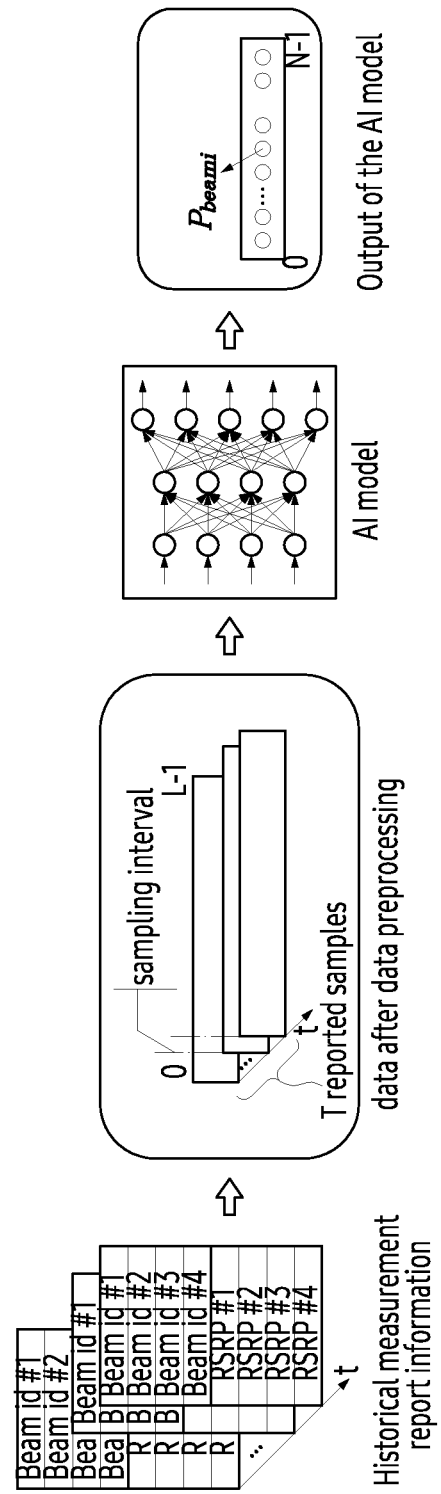
FIG. 5 is a schematic diagram of AI model-based beam management in an example embodiment.

Specifically, the process for obtaining the predicted TCI subset at the base station 110 may be implemented by an AI model (e.g., a prediction model). The implementation of the AI model may be achieved by the combination of the long short-term memory (LSTM) and the residual network (Res-NET). As shown in FIG. 5, first, the historical measurement report information reported by the UE is preprocessed and the data obtained after the preprocessing is input into the AI model. The AI model obtains the movement trajectory of the UE in the beam space corresponding to each beam based on the input data, and the movement trajectory of the UE in the beam space corresponding to each beam can characterize the movement trend of the UE. Then the switching probability of each beam in the full beam set is output in combination of the distribution information and switching information of each beam. It should be noted that the base station 110 can receive the historical measurement report information reported by all UEs covered by each beam in the full beam set, and the AI model can learn the distribution information and switching information of each beam based on the historical measurement report information reported by these UEs in the process of training the AI model. The distribution information and switching information of each beam can be obtained in the process of obtaining the predicted TCI subset using the trained AI model.

Finally, the base station 110 determines the corresponding predicted TCI subset based on the switching probabilities of each beam. Specifically, a preset number of beams with the highest switching probability in the full beam set can be determined to be the beams in the predicted TCI subset based on capability information of the UE.

The historical measurement report information of the UE is a chronological sequence. Each measurement report includes the beam identifies of up to four best beams and their corresponding reference signal receiving power (RSRP) values, and the beam identifies and the corresponding RSRPs may also be referred to together as measurement values.

The pre-processing of the historical measurement report information may include sampling it in the time dimension at a preset sampling interval and converting each of the sampled measurement values into a vector of a designated form. As shown in FIG. 5, T vectors of L dimensions are obtained.

The switching probability ($P_{beami}$) of each beam output by the AI characterizes the probability value that the UE will switch to each beam when the serving beam switching is performed in the future. The switching probability is not an absolute probability, but a value for relative comparison. Specifically, the value of the "switching probability" is a comprehensive representation of the following two pieces of information:

(1) Information for characterizing the order of future beam switching.

Figure 6A:
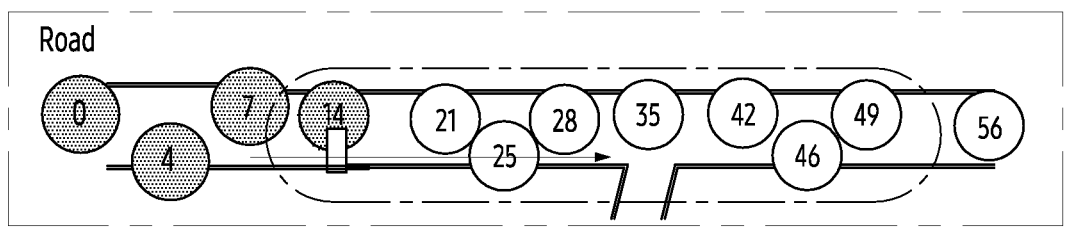
FIG. 6A is a schematic diagram of the switching probability characterizing the order of future beam switching in an example embodiment.

Assuming that the UE moves in the direction shown in FIG. 6A, when the AI model is used to perform the TCI subset prediction, the "switching probability" output by the AI model will be $P_{beam14} > P_{beam21} > P_{beam25}$. This is because when the AI model is trained, it is given different levels of activation depending on the order of the beam switching. The closer to the current moment, the more important it is, e.g., beam 21 is more important than beam 25 in the figure. If beam 25 is not included in the TCI subset, even if the TCI subset includes all the beams except beam 25, the UE will still experience the beam switching for scenario #3 or scenario #4 very quickly.

(2) Information characterizing the overall movement trend of the UE as reflected in the dataset used to train the AI model.

Figure 6B:
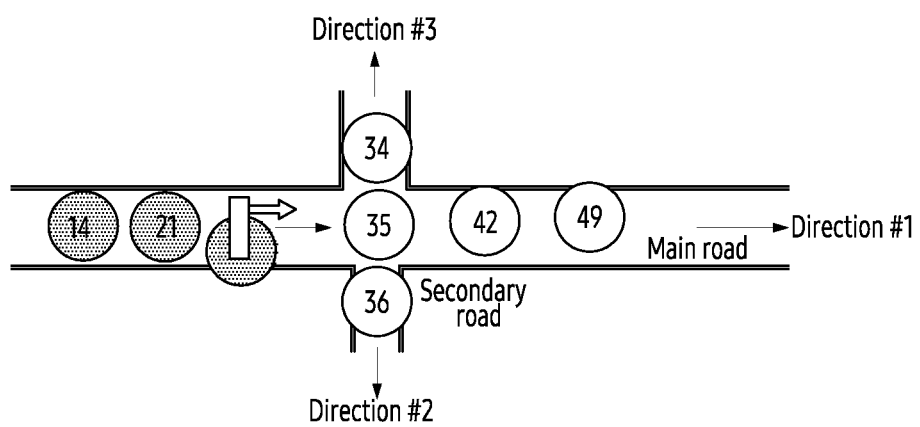
FIG. 6B is a schematic diagram of the switching probability characterizing the overall movement trend of the UE as reflected in the dataset used to train the AI model in an example embodiment.

In the scenario shown in FIG. 6B, because of the high traffic on the main road, the training dataset will also include more samples moving towards direction #1 compared to directions #2 and #3, and the AI model will learn this overall trend reflected in the training dataset when it is trained. Therefore, when performing the TCI subset prediction for the UE as shown in FIG. 6B, the "switch probabilities" $P_{beam34}$ and $P_{beam36}$ (low traffic on the secondary or minor roads) output by the AI model is less than $P_{beam35}$, $P_{beam42}$, and $P_{beam49}$ (high traffic on the main road, e.g., the probability that the UE will continue on the main road when moving through the intersection is great in the figure).

In an optional embodiment, determining, using a prediction model, the switching probability corresponding to each beam in the full beam set based on the historical measurement report information reported by the UE, includes:

sampling the historical measurement report information in a preset way to obtain measurement values of each sample beam corresponding to each sampling in the historical measurement report information; and determining, using the prediction model, the switching probability corresponding to each beam in the full beam set based on the measurement values of each sample beam.

Specifically, the historical measurement report information is sampled in a preset way, the measurement values corresponding to each sample beam in the historical measurement report information obtained from each sampling are obtained, and then the measurement values of each sample beam are pre-processed, and the switching probability corresponding to each beam in the full beam set can be obtained by using a prediction model based on the pre-processed measurement values.

In an optional embodiment, the determining, using the prediction model, the switching probability corresponding to each beam in the full beam set based on the measurement values of each sample beam, includes:

obtaining at least one of a vertical orientation angle, a horizontal orientation angle, a beam width, and a beam vector of each sample beam, wherein the beam vector characterizes distribution information of the beams and switching information among the beams; and determining, using the prediction model, the switching probability corresponding to each beam in the full beam set based on at least one of the obtained vertical orientation angle, the horizontal orientation angle, the beam width, and the beam vector, as well as the measurement values of each sample beam.

Before explaining the method of data pre-processing, the concept of a beam vector is introduced. In the physical sense, the beam vector can be understood as representing the relative positions or distributions between beams in a high dimensional space. Information on the relative position or distribution between beams is useful for AI models (e.g., predictive models) to identify movement trend of the UE and to predict the future serving beams.

In the present application, instead of relying on the location information of the UE, the past beam trajectories of the UE are used in a beam space to infer the future beam trajectories of the UEs. So, the information about how the beams are located relative to each other, how they are distributed, and what beams the UE can switch between is important.

Figure 7:
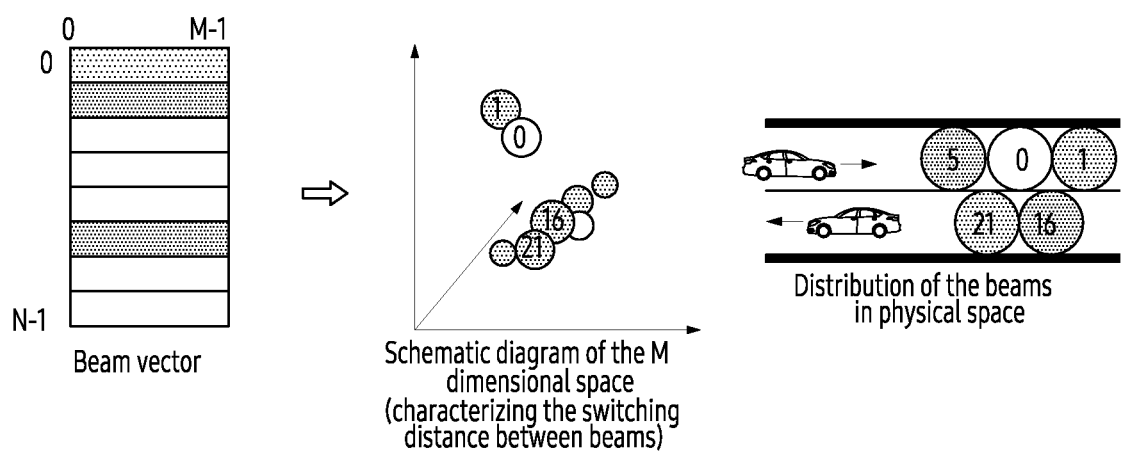
FIG. 7 is a schematic diagram that the beam vector characterizes the switching distance in an example embodiment.

It should be noted that "how the beams are distributed in physical space" is not exactly the same as "what beams the UE can switch between", because the movement of the UE is limited by the physical space. Even if beam 21 and beam 0, as shown in FIG. 7, are distributed next to each other in the physical space, if the area covered by them is on either side of a two-way road lane (beam 0 in one lane and beam 21 in the opposite lane with an isolated zone therebetween), or if they are separated by an obstacle (e.g., a river) that the UE cannot move past, then the serving beam for the UE will hardly switch from beam 21 to beam 0 (and vice versa). That is, beam 21 and beam 0 are not adjacent to each other if the "actual switching distance (e.g., the switching distance hereinafter)" is taken into account.

The beam vector for each beam is represented by an M-dimensional vector. Then, the "actual switching distance" between the beams may be expressed by the degree of similarity between the beams. The more similar the vectors are, the closer their beams are in distribution and the more likely they are to switch between each other. The degree of similarity between the vectors can be measured in terms of cosine similarity or Euclidean distance.

Specifically, the aforementioned AI model (e.g., prediction model), which can also be referred to as the TCI subset prediction model, can also be used in the pre-processing of historical measurement report information, specifically the beam vector acquisition model can be used to obtain the beam vectors of the sample beams.

Figure 8:
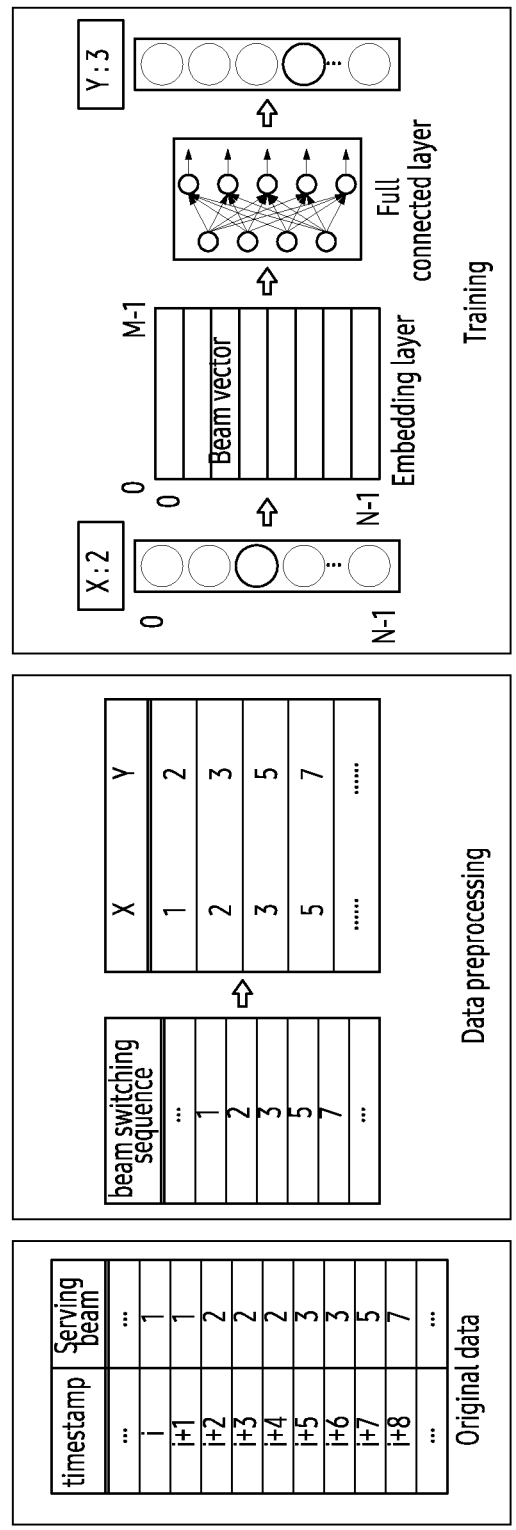
FIG. 8 is a schematic diagram for obtaining a beam vector based on the AI model in an example embodiment.

In a specific model implementation, the beam vector corresponding to each sample beam is actually the weight of a specific layer of the neural network in the model, which is usually called the embedding layer, specifically, the input of this embedding layer is the beam identity of a certain beam and the output is the beam vector corresponding to that beam. Two training methods for the them are available:

One method is to train the beam vectors together when training the above TCI subset prediction model, e.g., the embedding layer representing the beam vectors (e.g., the beam vector acquisition model) and the TCI subset prediction model are concatenated; the other method is to train the beam vectors separately, as shown in FIG. 8, e.g., to train another AI model. The sample data used for the training of this AI model is a pair of adjacent switchable beams, e.g., beam 2 and beam 3 are used as the input and output respectively. The training idea is to enable this AI model to give the adjacent switchable beam (output) of the designated beam (e.g., the input). After training, the embedding layer representing the beam vectors is then migrated to the training of the TCI subset prediction model.

The data pre-processing process is described in detail below.

In an optional embodiment, the sampling the historical measurement report information in a preset way, includes at least one of the following:

sampling the historical measurement report information once every preset time interval;

performing the sampling once when a corresponding designated beam for the UE changes; and performing the sampling once when the switching distance between the corresponding serving beam for the UE and a corresponding serving beam at last sampling is not less than a second preset distance.

Specifically, in the time dimension, data sampling of the historical measurement report information can be performed by selecting T samples from the most recent measurement report at a certain sampling interval. The T is a preset value for the training of a TCI subset prediction model, e.g., T=5, e.g., 5 UE measurement reports are used for prediction. Sampling can be performed in three preset approaches:

(1) Equal time interval sampling, e.g., the historical measurement report information is sampled once every preset time interval.

The sampling interval is set to a fixed period of time, typically an integer multiple of the UE measurement or reporting period. For example, a typical value for the SSB period is 20 ms and assuming that the UE has 8 reception beams for beam sweeping, the sampling time interval may be 20*8*5=800 ms.

The advantage of this approach is that there are fewer application restrictions, especially for UEs that have accumulated relatively little historical measurement report data (e.g., UEs that have just been powered on) or UEs the serving beam switching of which occurs rarely (e.g., UEs that are less mobile).

(2) Equal beam interval sampling, e.g., the sampling is performed once when the corresponding designated beam for the UE changes for a preset number of times.

The sampling interval is set to a number of changes of the designated beam. The designated beam may be the serving beam or may also be the best beam in the measurement reported by the UE. For example, the sampling is performed every time the serving beam changes, and the measurement with the highest reported RSRP of the serving beam during this time period is selected as a sample.

The benefit of this approach is that the TCI subset prediction model can be given more beam switching information, allowing the TCI subset prediction model to better identify the movement trend of the UE.

(3) Non-equally spaced sampling, wherein the sampling is performed once when the switching distance between the corresponding serving beam for the UE and the corresponding serving beam at the time of the previous sample is not less than a second preset distance.

The sampling is performed once when the switching distance between the corresponding serving beam for the UE and a corresponding serving beam at the last sampling exceed a certain threshold (e.g., the second preset distance). At this time, the sampling interval is not a fixed number of beam changes, and instead the sampling is performed once when the beams are spaced far enough apart. For example:

$$sim(V_{pre}, V_{next}) > Th_{sim\_interval}$$

wherein $V_{pre}$ is the beam vector corresponding to the serving beam at the time of the last sampling;

$V_{next}$ is the beam vector corresponding to the serving beam at this sampling;

sim ( ) is the cosine similarity of the two vectors.

The advantage of this approach is that it can better help the TCI subset prediction model to capture the long-term movement trend of the UE, producing a similar effect as filtering the original data, filtering small perturbations and extracting large trends. This is particularly suitable when forecasting a relatively large TCI subset.

The above three approaches can be chosen dynamically according to the actual situations, e.g., (1) is used when the accumulation of the historical measurement report data of the UE is relative small; (2) is chosen when the accumulation of the historical measurement report data has included more than T changes of serving beam/the reported best beam; and (3) is chosen when the accumulation of the historical measurement report data has far more than T changes of serving beam/the reported best beam, and the Subset_tci needs to be predicated.

Figure 9:
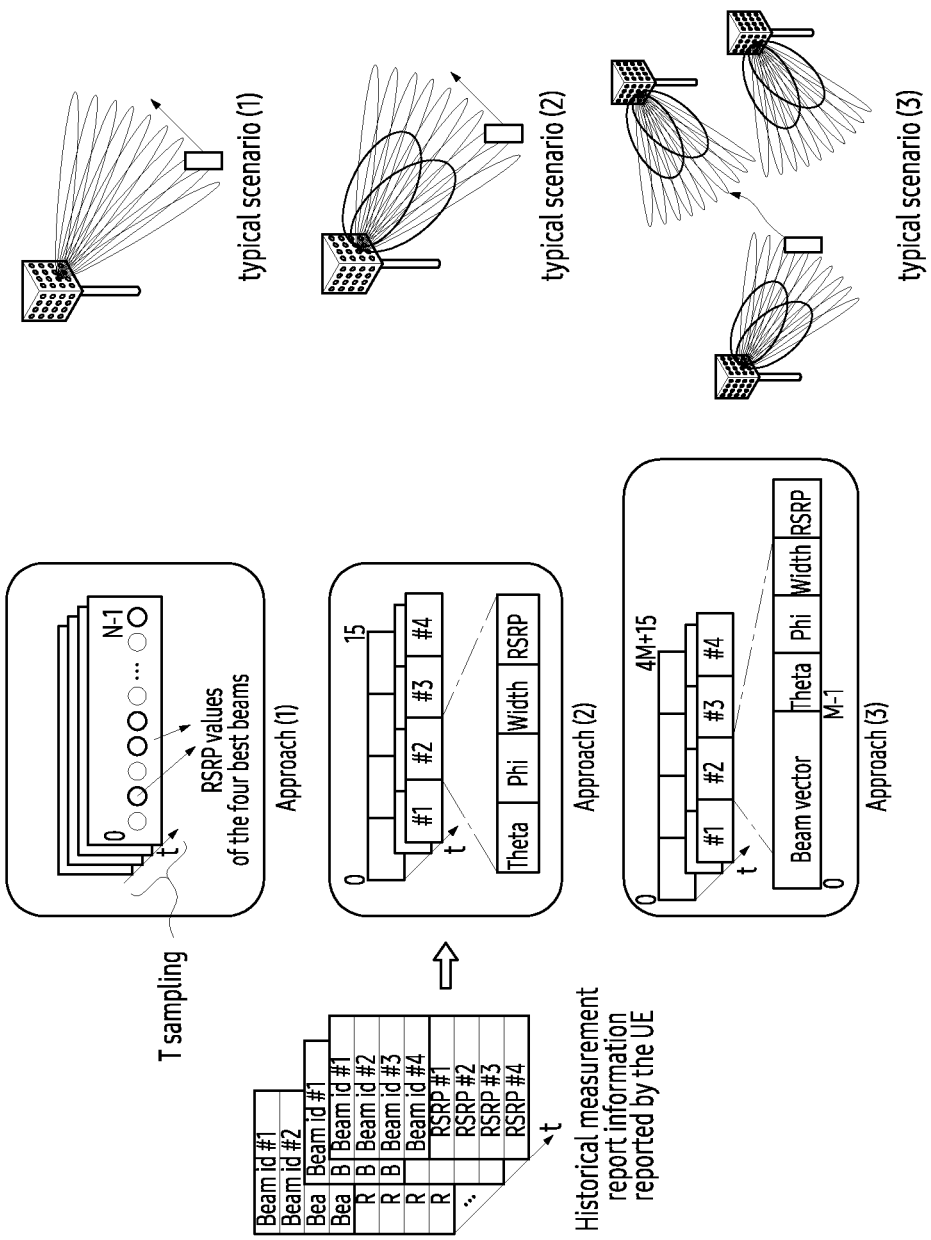
FIG. 9 is a schematic diagram of three different approaches for performing preprocessing on historical measurement reports in an example embodiment.

After the sampling is completed, the measurement values in the historical measurement report information for each sampling are processed and converted to L-dimensional vectors, as shown in FIG. 9, which can include the following three approaches.

(1) The beam identity (beam id) and the RSRP values are converted into an L-dimensional vector, where L=N (N is the number of beams in the full beam set), e.g., each value in this vector corresponds to one beam in the full beam set. The four RSRP values reported by the UE are placed in the positions corresponding to the four beams, and the values in the other positions are set to a default value.

Approach (1) applies to the typical scenario (1) shown in FIG. 9, e.g., the TCI subset prediction in a cell, wherein each beam is identified by an SSB.

(2) each pair of values (beam id, RSRP) reported by the UE is transformed into a (Theta, Phi, Width, RSRP) representation. Wherein Theta, phi and Width are the vertical orientation angle, horizontal orientation angle and beam width of the corresponding beam respectively.

Approach (2) applies to the typical scenario (1) in FIG. 9, and also to the typical scenario (2), e.g., the TCI subset prediction in a cell, wherein the transmission beam for the BS 110 may be or include a wide beam and a narrow beam in a hierarchical structure, e.g., the wide beam may be identified by the SSB and the narrow beam may be identified by the CSI-RS.

The advantages of approach (2) lie in:

(a) By providing (Theta, Phi, Width) for the beams, more beam-related information is given to the TCI subset prediction model. Especially when the BS 110 uses a hierarchical beam structure, such a hierarchical structure cannot be directly deduced from the information of the beam id. In a physical sense, (Theta, Phi, Width) is the direction of the beam and RSRP is the intensity in this direction. This allows the TCI subset prediction model to better identify the movement trend of the UE and to infer the best TCI subset.

(b) Dimension reduction of the data. If approach (1) continues to be used to cope with the typical scenario (2), L is $N_{sbb} N_{CSI\_RS}$, wherein $N_{sbb}$ is the number of beams identified by the SSB and $N_{CSI\_RS}$ is the number of beams identified by the CSI-RS. That is, L is increased, but there are still only four values carrying information, which will have the problem of data sparsity and is not beneficial to the parsing of the data by the neural network. Using approach (2), it is possible to reduce the $N_{sbb} N_{CSI\_RS}$ dimensional data to 4*4=16 dimensions.

(3) A representation of a beam vector is also added for each beam reported by the UE, e.g., each pair of the values (beam id, RSRP) reported by the UE is transformed into the representation of (beam vector, Theta, Phi, Width, RSRP).

Approach (3) applies to the typical scenarios (1) and (2) in addition to the typical scenario (3), e.g., inter-cell TCI subset prediction, wherein not only the beam of this cell, but also the beams of the adjacent cells are taken into account.

The advantages of approach (3) lie in:

(a) Dimension reduction of the data. In the typical scenario (3), the problem of data sparsity will be more severe, because the UE is reporting four beams with the highest RSRP among the $\Sigma_{i=0}^{i=c} n_i$ (c is the number of adjacent cells, $n_i$ is the number of beams in the adjacent cells i, and $n_0$ is the number of beams in this cell) beams. In contrast to the approach (1), the approach (3) can reduce the $\Sigma_{i=0}^{i=c} n_i$ dimensional data to 4*(M+4) dimensions, wherein M is the dimensionality of the beam vector.

(b) More beam-related information is given to the TCI subset prediction model through the beam vector. Since the reference coordinate system of (Theta, Phi) is not uniform for the beams of different cells in the typical scenario (3), it is not possible to use only (Theta, Phi, Width, RSRP) to identify the pair of values (beam id, RSRP) reported by the UE as in the approach (2).

In an optional embodiment, the current TCI subset meets a first preset condition, includes at least one of the following:

a number of beams that had been used as serving beams for the UE in the current TCI subset is not less than a first preset number;

a switching probability corresponding to a current corresponding serving beam for the UE in a last predicted TCI subset is not greater than a first preset threshold; and a switching distance between the current corresponding serving beam for the UE and a corresponding serving beam at the time of a last TCI subset update is not less than a first preset distance.

Wherein the preset number is determined based on size of the TCI subset corresponding to the UE.

Wherein the first preset threshold is determined based on the switching probabilities corresponding to at least one designated beam in the last TCI subset prediction result.

Wherein the first preset distance is determined based on the switching distance between each beam in the current TCI subset for the UE and the corresponding serving beam at the time of the last TCI subset update.

Specifically, the current TCI subset meets a first preset condition, includes the following three situations:

Situation 1: considering that how many beams in the current TCI subset had been used as the serving beams.

For example, the TCI subset prediction is triggered when the following condition is met, e.g., the number of beams in the current TCI subset that have become serving beams for the UE since the last TCI subset configuration update is not less than a preset number:

$N_{swtiched} \geq Th_{beams}$ where $N_{swtiched}$ is the number of beams in the current TCI subset that have become the serving beams since the last TCI subset configuration update; $Th_{beams}$ denotes a threshold value (e.g., a preset number), the value of which can be set by referring to the following:

(a) referring to the size of the TCI subset. For example, it may be set to half the size of the TCI subset, e.g., for a Subset_active of size 8, $Th_{beams}$ may be set to 4.

(b) set according to the actual tested performance of the TCI subset prediction model. For example, the actual performance testing shows that a prediction is performed on a Subset_active of size 8; every time the configuration is updated based on the prediction result, there is a 70% probability that five times of beam switching can be maintained without triggering scenarios #3 or #4. Then, based on the test result, Th beams may be set to 5.

Figure 10:
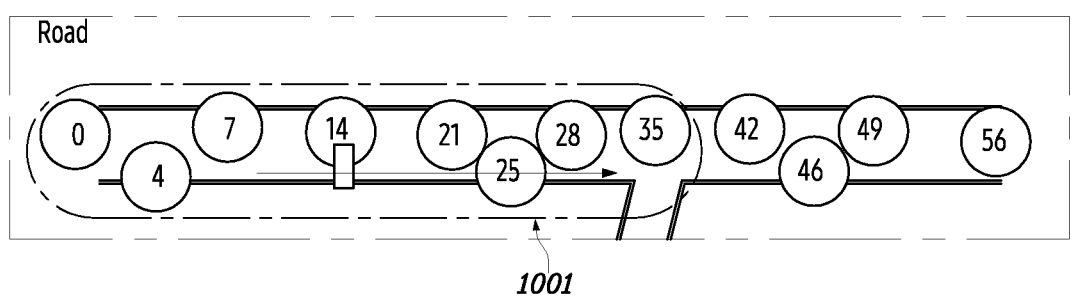
FIG. 10 is a schematic diagram of a situation 1 in which a current TCI subset meets a first preset condition in an example embodiment.

As an example, considering a TCI subset of size 8, $Th_{beams}$ is set to 4. As shown in FIG. 10, the UE moves along the road. The configuration of the current TCI subset is shown in the figure by a circle 1001 and contains 8 beams. In the current TCI subset, the serving beam for the UE has been switched in the following order: beam0→beam4→beam7→beam14, e.g., $N_{swtiched}$=4, the condition $N_{swtiched} \geq Th_{beams}$ is met and the TCI subset prediction is triggered.

Situation 2: considering whether the latest target serving beam (e.g., the current corresponding serving beam for the UE) is the one with a higher switching probability as predicted in the latest prediction (e.g., the last TCI subset prediction).

For example, when the following conditions are met, that is, the switching probability of the current corresponding serving beam for the UE (e.g., the latest target serving beam) in the last TCI subset prediction result (e.g., the switching probability of each beam) is not greater than a first preset threshold, the TCI subset prediction is triggered:

$P_{New} < T_{hp}$ wherein $P_{New}$ is the switching probability corresponding to the latest target serving beam determined from the last TCI subset prediction result; $T_{hp}$ denotes a threshold value (the first preset threshold), the value of which can be set by referring to:

(a) the average switching probability of the m beams with the highest switching probability in the last TCI subset prediction result; and (b) the switching probability ranked at the m-th place in the last TCI subset prediction result.

The physical meaning corresponding to situation 2 may be that when a UE has switched to a beam with a relatively low switching probability according to the TCI subset prediction model, the prediction result should be updated in time based on the latest measurement data of the UE in order to check whether the current TCI subset is still in compliance with the movement trend of the UE.

For example, considering that $T_{hp}$ is set to the switching probability ranked at the fourth place in the last TCI subset prediction.

Figure 11:
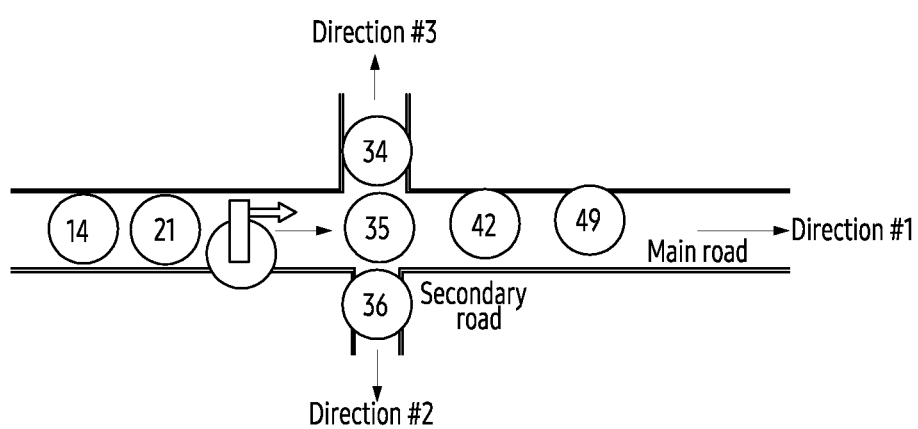
FIG. 11 is a schematic diagram of a situation 2 in which a current TCI subset meets a first preset condition in an example embodiment.

As shown in FIG. 11, the UE advances to a crossroad and in fact there are three possible directions ahead along the main road. The TCI subset prediction model cannot accurately determine which direction the UE will actually proceed in according to the historical measurement report of the UE. However, since there is more traffic on the main road and there are more samples in direction #1 in the dataset used in the training phase of the TCI subset prediction model, the predicted output of the TCI subset prediction model will reflect this overall trend, e.g., the switching probability of the corresponding beam in direction #1 may be greater than the switching probability of the corresponding beams in directions #2 and #3. For example, the last TCI subset prediction is performed when the UE advances to beam 14, and the prediction result given by the TCI subset prediction model is $P_{beam14} > P_{beam21} > P_{beam25} > P_{beam35} > P_{beam42} > P_{beam49} > P_{beam36} > P_{beam34} > \ldots$ At this time, $T_{hp} = P_{beam35}$, if the UE eventually advances along direction #3, then when the UE switches to beam 34, $P_{New} = P_{beam34}$, the condition $P_{New} < T_{hp}$ is met and the TCI subset prediction is triggered.

Situation 3: considering how far the "distance (e.g., switching distance)" is between the latest serving beam (e.g., the current corresponding serving beam for the UE) and the serving beam at the time of the last TCI subset update.

For example, when the following conditions are met, that is, the switching distance between the current corresponding serving beam for the UE and the corresponding serving beam at the time of the last TCI subset update is not less than a first preset distance, the TCI subset prediction is triggered:

$$\mathrm{sim}(V_{New}, V_{Last}) = \frac{V_{New}^T V_{Last}}{\|V_{New}\|_2 \|V_{New}\|_2} > Th_{sim}$$

where $V_{New}$ is the beam vector corresponding to the latest servicing beam, $V_{Last}$ is the beam vector corresponding to the servicing beam at the last TCI subset update, sim( ) is the cosine similarity between the two vectors and $Th_{sim}$ denotes a threshold value (e.g., the first preset distance), the value of which can be set by referring to:

The average cosine similarity of the beam vectors corresponding to the other beams in the current TCI subset and $V_{Last}$.

The physical meaning of this situation may be that when the UE has moved to a beam at a longer "distance" from the serving beam at the time of the last TCI subset configuration, the prediction result should be updated in time based on the latest measurement data of the UE in order to check whether the current TCI subset is still in compliance with the movement trend of the UE. The "distance" here is measured based on the beam vectors corresponding to the two beams.

Figure 12:
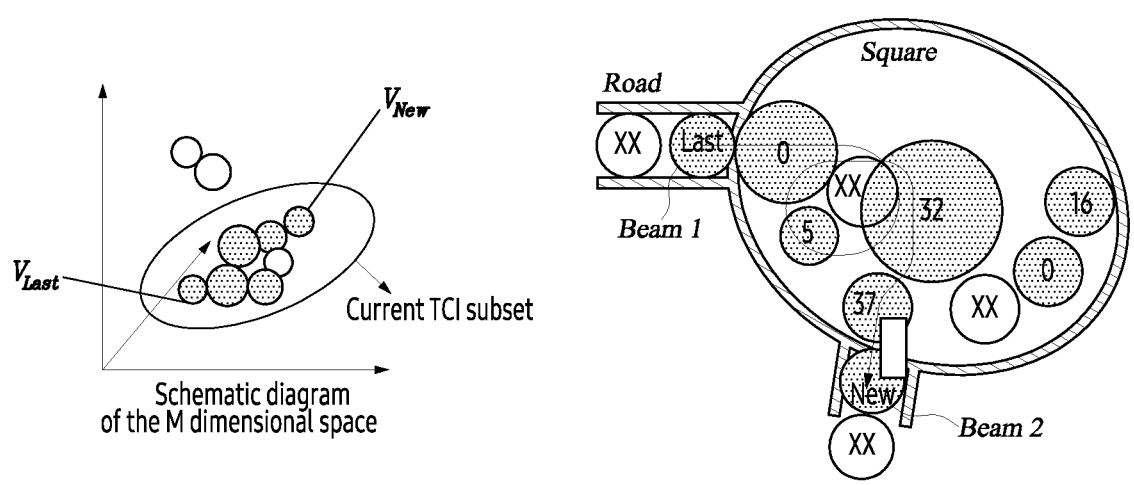
FIG. 12 is a schematic diagram of a situation 3 in which a current TCI subset meets a first preset condition in an example embodiment.

For example, considering that the coverage area of the BS 110 contains a relatively open area, such as a square shown in FIG. 12. Since there are fewer physical space constraints in an open area such as a square, the beam covering the square will be adjacent to a larger number of beams. That is, the beam vectors corresponding to the beams covering the square have a higher degree of similarity to each other. However, the beam vectors (corresponding to $V_{Last}$ and $V_{New}$ respectively) of Beam 1 and Beam 2, which cover the road, are less similar, because the "distance" for the switching between the two beams is longer. As shown in the drawing, the serving beam for the UE at the time of the last TCI subset update is Beam 1. When the UE has moved from Beam 1 to Beam 2, the TCI subset prediction is triggered because the cosine similarity distance between Beam 1 and Beam 2 is the farthest in the current TCI subset.

As described above, the BS 110 can select one or more of the above situations from the above situations depending on the coverage scenario to perform by itself. In addition, a balance between computational overhead and performance can be achieved by adjusting the thresholds in the above situations. Setting thresholds that are easier to trigger indicates that the BS 110 can monitor the movement of the UE in real time more.

In an optional embodiment, the degree of difference between the current TCI subset and the predicted TCI subset meets a second preset condition, includes at least one of the following:

an occupancy proportion of beams in the current TCI subset that are identical to the predicted TCI subset to the predicted TCI subset is not greater than a second preset threshold; and a ratio of the sum of the switching probabilities corresponding to all beams in the current TCI subset to the sum of the switching probabilities corresponding to all beams in the predicted TCI subset is not greater than a third preset threshold.

Specifically, the degree of difference between the current TCI subset and the predicted TCI subset meets a second preset condition includes the following two situations:

Situation 1: Considering the proportion of the beams contained in both $S_{predict}$ (the predicted TCI subset) and $S_{current}$ (the current TCI subset) to the whole set; the TCI subset update is triggered when the following condition is met, e.g., the occupancy proportion of beams in the current TCI subset that are identical to beams in the predicted TCI subset to the predicted TCI subset is not greater than a second preset threshold.

$$\frac{\mathrm{size}(S_{predict} \cap S_{current})}{\mathrm{size}(S_{predict})} < Th_1$$

wherein, size( ) denotes the size of the set; size($S_{predict}$) = size($S_{current}$) and $Th_1$ is the second preset threshold.

Figure 13:
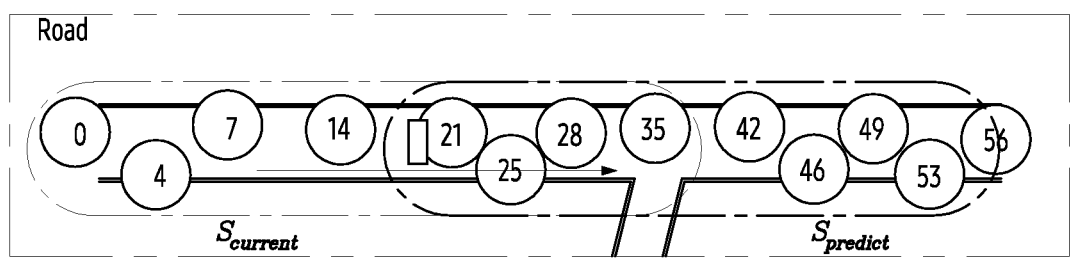
FIG. 13 is a schematic diagram of a situation 1 in which the degree of difference between a current TCI subset and a predicted TCI subset meets a second preset condition in an example embodiment.

As an example, as shown in FIG. 13, $S_{predict}$={21,25,28,35,42,46,49,53}, $S_{current}$={0,4,7,14,21,25,28,35}, and Size($S_{predict} \cap S_{current}$)=4, if the setting is $Th_1$=0.5, then no TCI subset configuration update is triggered.

Situation 2: considering the overall switching probability corresponding to $S_{predict}$ and $S_{current}$ The TCI subset prediction is triggered when the following condition is satisfied, e.g., a ratio of the sum of the switching probabilities corresponding to all beams in the current TCI subset to the sum of the switching probabilities corresponding to all beams in the predicted TCI subset is not greater than a third preset threshold.

$$\frac{\sum_{i \in S_{current}} P_i}{\sum_{i \in S_{predict}} P_i} < Th_2$$

wherein $P_i$ is the switching probability of the i-th beam according to the latest prediction, and $Th_2$ is the third preset threshold.

Figure 14:
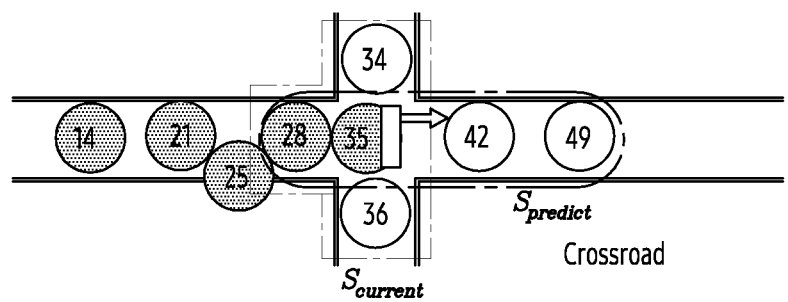
FIG. 14 is a schematic diagram of a situation 2 in which the degree of difference between a current TCI subset and a predicted TCI subset meets a second preset condition in an example embodiment.

For example, as shown in FIG. 14, $S_{predict}$={28,35,42,49}, $S_{current}$={28,34,36,35}, according to the latest prediction result, the beams contained in these two sets correspond to the following switching probabilities: {beam28:3.682, beam34:0.356, beam36:1.121, beam35:3.482, beam42:5.874, beam49:5.374 . . . }, then $\Sigma_{i \in S_{current}} P_i$=8.641, and $\Sigma_{i \in S_{predict}} P_i$=18.412. If the setting is $Th_2$=0.5, a TCI subset configuration update is triggered.

Situation 2 measures the difference between the two sets with a finer granularity than situation 1, and it is more suitable for configuring a TCI subset with a smaller set size.

The thresholds in both situations above measures the degree of difference between $S_{predict}$ and $S_{current}$. The BS 110 can adjust this threshold to set how much signalling overhead is required to avoid the scenarios #3 and #4. For example, if the service of the UE is delay sensitive and high priority, then the threshold may be set relatively large, e.g., it is easier to trigger an update of the TCI subset in advance; if the current cell is in a high load state, then the threshold can be set relatively small, e.g., it is more difficult to trigger an update of the TCI subset in advance.

Figure 15:
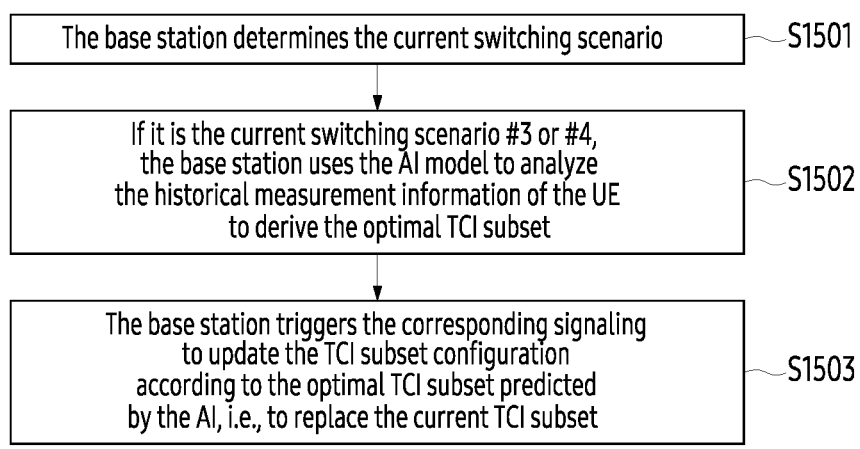
FIG. 15 is a schematic diagram of a beam management method when a current switching scenario is scenario #3 or #4 in an example embodiment.

It should be noted that as shown in FIG. 15, the beam management method provided by an embodiment may include:

In the operation S1501, the base station 110 determines the current switching scenario.

In the operation S1502, if it is the current switching scenario #3 or #4, the base station 110 analyzes the historical measurement information of the UE to derive the optimal TCI subset (e.g., predicted TCI subset) by using the AI model. In the operation S1503, the base station 110 triggers the corresponding signaling to update the TCI subset configuration according to the optimal TCI subset predicted by the AI, e.g., to replace the current TCI subset.

Specifically, when the beam switching of the scenarios #3 and #4 occurs, there is no need to determine whether the current TCI subset meets the first preset condition and whether the degree of difference between the current TCI subset and the predicted TCI subset meets the second preset condition, and the TCI subset is directly predicted based on the AI model and the TCI subset is updated.

Figure 16:
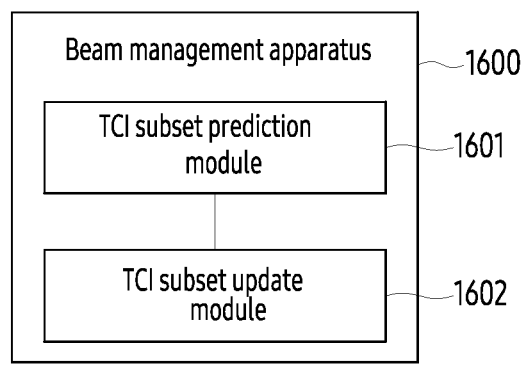
FIG. 16 is a structural block diagram of a beam management apparatus provided by an embodiment.

FIG. 16 is a structural block diagram of beam management apparatus provided by an embodiment. As shown in FIG. 16, the beam management apparatus 1600 may include a TCI subset prediction module 1601 and a TCI subset update module 1602, wherein:

the TCI subset prediction module 1601 is configured to obtain a predicted TCI subset for a UE; and the TCI subset update module 1602 is configured to determine a TCI subset corresponding to the UE based on the predicted TCI subset.

According to the solution provided by the present application, a predicted TCI subset fitting the movement trend of the UE is configured according to the beam switching situation of the UE, and the current TCI subset is replaced with the predicted TCI subset in a timely manner based on the degree of difference between the current TCI subset and the predicted TCI subset. Since the beams in the predicted TCI subset fit the movement trend of the UE, then the target serving beam for the UE when performing serving beam switching will belong to the predicted TCI subset with a greater possibility, thus reducing the occurrence of the scenario #3 and the scenario #4 when the UE performs the serving beam switching, and thus reducing the beam switching delay.

In an optional embodiment, the TCI subset prediction module is specifically configured for:

obtaining the predicted TCI subset for the UE according to a set prediction period; and obtaining the predicted TCI subset for the UE based on a current TCI subset for the UE.

According to the solution provided by the present application, a predicted TCI subset fitting the movement trend of the UE is configured according to the beam switching situation of the UE, and the current TCI subset is replaced with the predicted TCI subset in a timely manner based on the degree of difference between the current TCI subset and the predicted TCI subset. Since the beams in the predicted TCI subset fit the movement trend of the UE, then the target serving beam for the UE when performing serving beam switching will belong to the predicted TCI subset with a greater possibility, thus reducing the occurrence of high delay scenarios (e.g., the scenario #3 and the scenario #4) when the UE performs a serving beam switching, and thus reducing the beam switching delay.

Each embodiment herein m ay be used in combination with any other embodiment(s) described herein.

In an optional embodiment, the TCI subset prediction module is further configured for:

obtaining the predicted TCI subset for the UE if the current TCI subset for the UE meets a first preset condition;

wherein the current TCI subset meets a first preset condition, includes at least one of the following:

a number of beams that had been used as serving beams for the UE in the current TCI subset is not less than a first preset number;

a switching probability corresponding to a current corresponding serving beam for the UE in a last TCI subset prediction result is not greater than a first preset threshold; and a switching distance between the current corresponding serving beam for the UE and a corresponding serving beam at the time of a last TCI subset update is not less than a first preset distance.

In an optional embodiment, the TCI subset prediction module is further configured for:

obtaining the predicted TCI subset for the UE based on historical measurement report information reported by the UE.

In an optional embodiment, the TCI subset prediction module is further configured for:

determining a switching probability corresponding to each beam in a full beam set based on the historical measurement report information reported by the UE; and determining the predicted TCI subset from the full beam set based on the switching probabilities.

In an optional embodiment, the TCI subset prediction module is further configured for: determining, using a prediction model, the switching probability corresponding to each beam in the full beam set based on the historical measurement report information reported by the UE.

In an optional embodiment, the TCI subset prediction module is further configured for:

sampling the historical measurement report information in a preset way to obtain measurement values of each sample beam corresponding to each sampling in the historical measurement report information; and determining, using the prediction model, the switching probability corresponding to each beam in the full beam set based on the measurement values of each sample beam.

In an optional embodiment, the TCI subset prediction module is further configured for:

obtaining at least one of a vertical orientation angle, a horizontal orientation angle, a beam width, and a beam vector of each sample beam, wherein the beam vector characterizes distribution information of the beams and switching information among the beams; and determining, using the prediction model, the switching probability corresponding to each beam in the full beam set based on at least one of the obtained vertical orientation angle, the horizontal orientation angle, the beam width, and the beam vector, as well as the measurement values of each sample beam.

In an optional embodiment, the TCI subset prediction module is further configured for at least one of the following:

sampling the historical measurement report information once every preset time interval;

performing the sampling once when a corresponding designated beam for the UE changes for a preset number of times; and performing the sampling once when the switching distance between the corresponding serving beam for the UE and a corresponding serving beam at last sampling is not less than a second preset distance.

In an optional embodiment, the TCI subset prediction module is further configured for:

determining, based on capability information of the UE, a second preset number of beams with the highest switching probability in the full beam set to be the beams in the predicted TCI subset.

In an optional embodiment, the first preset number is determined based on size of the TCI subset corresponding to the UE.

In an optional embodiment, the first preset threshold is determined based on the switching probabilities corresponding to at least one designated beam in the last TCI subset prediction result.

In an optional embodiment, the designated beam is a third preset number of beams with the highest switching probability in the last TCI subset prediction result or a beam with a switching probability arranged at a preset sequence order in the last TCI subset prediction result.

In an optional embodiment, the first preset distance is determined based on the switching distance between each beam in the current TCI subset for the UE and the corresponding serving beam at the time of the last TCI subset update.

In an optional embodiment, the switching distance is a degree of similarity between a beam vector of each beam in the current TCI subset and a beam vector of the corresponding serving beam at the time of the last TCI subset update.

In an optional embodiment, the TCI subset prediction module is specifically configured for:

updating the current TCI subset based on the predicted TCI subset, based on a degree of difference between the current TCI subset and the predicted TCI subset for the UE.

In an optional embodiment, the TCI subset prediction module is further configured for:

updating the current TCI subset based on the predicted TCI subset if the degree of difference between the current TCI subset and the predicted TCI subset meets a second preset condition;

the second preset condition includes at least one of the following:

an occupancy proportion of beams in the current TCI subset that are identical to beams in the predicted TCI subset to the predicted TCI subset is not greater than a second preset threshold; and a ratio of the sum of the switching probabilities corresponding to all the beams in the current TCI subset to the sum of the switching probabilities corresponding to all the beams in the predicted TCI subset is not greater than a third preset threshold.

Figure 17:
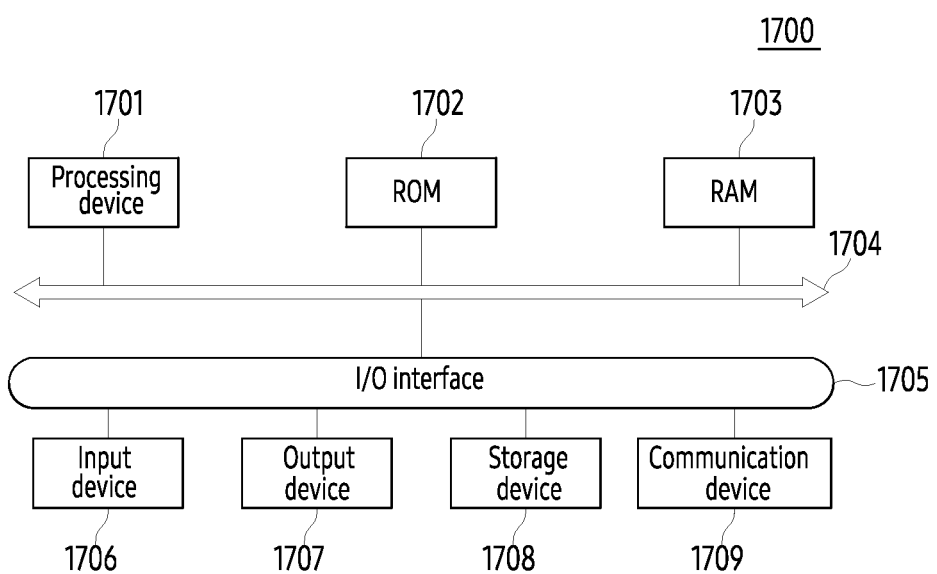
FIG. 17 is a structural schematic diagram of an electronic device provided by an embodiment.

Referring to FIG. 17, which shows a schematic structural diagram of an electronic device 1700 (for example, a terminal device or a server that executes the method shown in FIG. 2) suitable for implementing embodiments. The electronic devices in example embodiments may include, but are not limited to, mobile terminals (such as mobile phones, notebook computers, digital broadcast receivers, PDAs (personal digital assistants), PADs (tablet computers), PMPs (portable multimedia players), vehicle-mounted terminals (for example, car navigation terminals)) and fixed terminals (such as digital TVs, desktop computers, etc.). The electronic device shown in FIG. 17 is only an example, and should not bring any limitation to the functions and scope of use of example embodiments.

The electronic device includes: a memory and a processor, wherein the memory is configured to store programs for executing the methods described in the foregoing method embodiments; the processor is configured to execute the programs stored in the memory. Wherein, the processor here may be referred to as the processing device 1701 described below, and the memory may include at least one of a read-only memory (ROM) 1702, a random-access memory (RAM) 1703, and a storage device 1708, specifically shown as follows:

As shown in FIG. 17, the electronic device 1700 may include a processing device (such as a central processing unit, a graphics processor, etc.) 1701, which can execute various appropriate actions and processing according to programs stored in a read-only memory (ROM) 1702 or programs loaded from a storage device 1708 into a random-access memory (RAM) 1703. In RAM 1703, various programs and data required for the operation of the electronic device 1700 are also stored. The processing device 1701, ROM 1702, and RAM 1703 are connected, directly or indirectly, to each other through a bus 1704. An input/output (I/O) interface 1705 is also connected, directly or indirectly, to the bus 1704.

Generally, the following devices can be connected, directly or indirectly, to the I/O interface 1705: an input device(s) 1706 such as touch screen, touch pad, keyboard, mouse, camera, microphone, accelerometer, gyroscope, etc.; an output device(s) 1707 such as liquid crystal display (LCD), speaker, and/or vibration; a storage device(s) 1708 such as a magnetic tape, a hard disk, etc.; and a communication device(s) 1709. The communication device 1709, comprising communication circuitry, may allow the electronic device 1700 to perform wireless or wired communication with other devices to exchange data. Although FIG. 17 shows an electronic device having various devices, it should be understood that it is not required to implement or have all the illustrated devices. It may alternatively be implemented or provided with more or fewer devices.

In particular, according to example embodiments, the process described above with reference to the flowchart can be implemented as computer software programs. For example, example embodiments include a computer program product, which includes computer programs carried on a non-transitory computer readable medium, and the computer programs include program codes for executing the method shown in the flowchart. In such an embodiment, the computer programs may be downloaded and installed from the network through the communication device 1709, or installed from the storage device 1708, or installed from the ROM 1702. When the computer programs are executed by the processing device 1701, it executes the above functions in the method of the embodiment.

Figure 18:
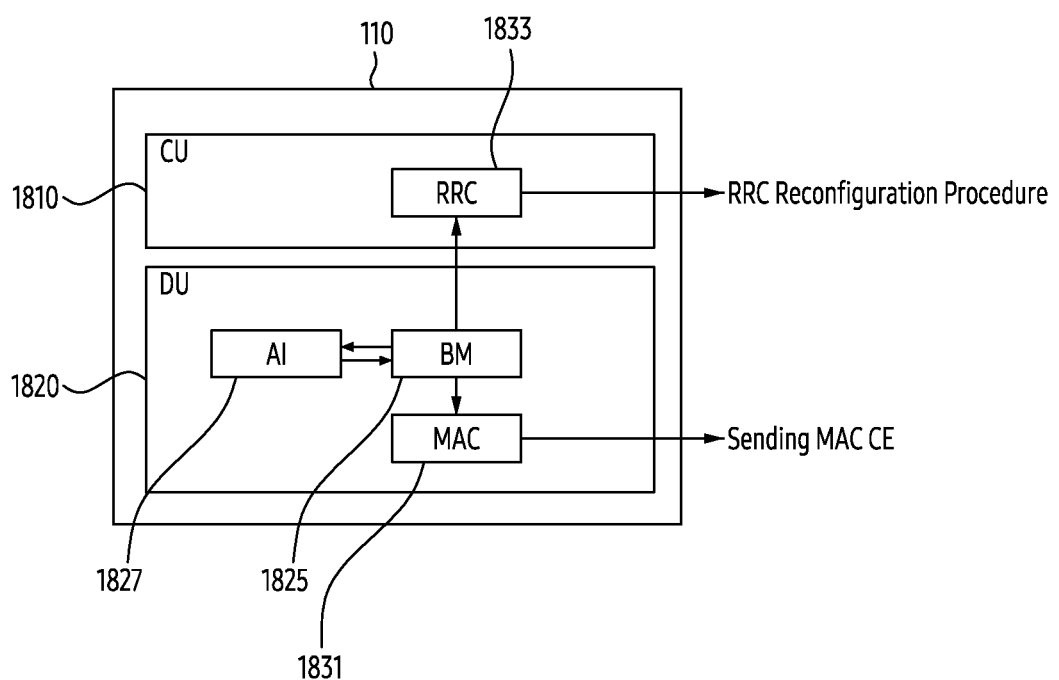
FIG. 18 is an example deployment of the electronic device and control signals provided by an embodiment.

FIG. 18 is an example deployment of the electronic device and control signals provided by an embodiment. The descriptions of FIG. 18 are illustrative, and the description of FIG. 18 is not to be construed as limiting other embodiments.

Referring to FIG. 18, The base station 110 (e.g., gNB) according to embodiments of the disclosure may be implemented with a distributed deployment according to a centralized unit (CU) 1810 configured to perform a function of upper layers (e.g., packet data convergence protocol (PDCP), radio resource control (RRC)) of an access network, and a distributed unit (DU) 1820 configured to perform a function of a lower layer. In this occasion, the distributed unit (DU) may include a digital unit (DU) and a radio unit (RU). Between the core network (e.g., 5G core (5GC) or next generation core (NGC)) and the radio network (RAN), the deployment of the base station 110 may be implemented in the order of CU, DU, and RU. The interface between the CU 1810 and the DU 1820 may be referred to as an F1 interface. The CU 1810 may be connected to one or more DUs to act as a higher layer than the DU. For example, the CU 1810 may be responsible for the functions of RRC 1833 and packet data convergence protocol (PDCP) layers, and the DU 1820 and the RU may be responsible for the functions of lower layers. The DU 1820 may perform some functions (high PHY) of the radio link control (RLC), the media access control (MAC), and the physical (PHY) layers, and the RU may be responsible for the remaining functions (low PHY) of the PHY layer. Further, as an example, the digital unit (DU) may be included in the DU 1820 according to implementation of a distributed arrangement of the base station. Hereinafter, unless otherwise defined, the operations of the digital unit (DU) and the RU will be described, but it is to be noted that various embodiments of the disclosure may be applied to both a base station deployment including the CU 1810 and a deployment in which the DU 1820 is directly connected to a core network, that is, being incorporated into a base station (e.g., an NG-RAN node) where the CU 1810 and the DU 1820 are one entity.

According to an embodiment, the CU 1810 can perform operations according to a radio resource control (RRC) signaling. For example, the CU 1810 may generate a RRC reconfiguration message. The CU 1810 may transmit the RRC reconfiguration message to the DU 1820. The RRC reconfiguration message includes configuration information for PDCCH and/or PDSCH. The configuration information includes information for TCI states. The DU 1820 may transmit the RRC reconfiguration message to the UE. The UE may identify the configuration of the TCI states. The set of TCI states are configured to the UE.

According to an embodiment, the DU 1820 comprises a beam management (BM) module 1825, an AI module 1827, and a MAC processing module 1831. The BM module 1825 may determine to do a TCI subset prediction based on algorithms described above. The BM module 1825 may send a request to the AI module 1827. The AI module 1827 may make TCI subset prediction and return the result to the BM module 1825. According to the beam switching scenario, the BM module 1825 may update TCI subset based on AI-inferred list. For example, in the scenario #4, the BM module 1825 may trigger the RRC reconfiguration procedure for updating of Subset_tci with the CU 1810 and the BM module 1825 may trigger sending MAC CE for updating Subset_active to the UE. For another example, in the scenario #3, the BM module 1825 may trigger sending MAC CE for updating Subset_active to the UE. According to an embodiment, the BM module 1825 may determine whether to update TCI subset in advance (e.g., before beam-switching).

It should be noted that the aforementioned computer readable medium in the present application may be a computer readable signal medium or a computer readable storage medium, or any combination of the two. The computer readable storage medium may be, for example, but not limited to, an electric, magnetic, optical, electromagnetic, infrared, or semiconductor system, apparatus, or device, or any combination of the above. More specific examples of computer readable storage medium may include, but are not limited to: electrical connections with one or more wires, portable computer disks, hard disks, random access memory (RAM), read-only memory (ROM), erasable programmable read only memory (EPROM or flash memory), optical fiber, portable compact disk read only memory (CD-ROM), optical storage device, magnetic storage device, or any suitable combination of the above. In the present disclosure, a computer readable storage medium may be any tangible medium that contains or stores a program, and the program may be used by or in combination with an instruction execution system, apparatus, or device. In the present disclosure, a computer readable signal medium may include a data signal propagated in a baseband or as a part of a carrier wave, and a computer readable program codes are carried therein. This propagated data signal can take many forms, including but not limited to electromagnetic signals, optical signals, or any suitable combination of the foregoing. The computer readable signal medium may also be any computer readable medium other than the computer readable storage medium. The computer readable signal medium may send, propagate, or transmit the program for use by or in combination with the instruction execution system, apparatus, or device. The program codes contained on the computer readable medium can be transmitted by any suitable medium, including but not limited to: wire, optical cable, RF (radio frequency), etc., or any suitable combination of the above.

In some embodiments, the client and server can communicate with any currently known or future-developed network protocol such as HTTP (HyperText Transfer Protocol), and can be interconnected with any form or medium of digital data communication (for example, communication network). Examples of communication networks include local area networks ("LAN"), wide area networks ("WAN"), the Internet (for example, the Internet), and end-to-end networks (for example, ad hoc end-to-end networks), as well as any currently known or future-developed network.

The above computer readable mediums may be contained in the above electronic device; or it may exist alone without being assembled into the electronic device.

The above computer readable medium carries one or more programs, and when the above one or more programs are executed by the electronic device, causing the electronic device to:

obtain a predicted transmission configuration indicator (TCI) subset for a user equipment (UE); and determine a TCI subset corresponding to the UE based on the predicted TCI subset. "Based on" as used herein covers based at least on.

According to embodiments, a method performed by a base station, comprises obtaining a predicted transmission configuration indicator (TCI) subset for a user equipment (UE). The base station determining a TCI subset corresponding to the UE based on the predicted TCI subset.

In an embodiment, the obtaining a predicted TCI subset for a UE, comprises obtaining the predicted TCI subset for the UE based on a set prediction period. The obtaining a predicted TCI subset for a UE, comprises obtaining the predicted TCI subset for the UE based on a current TCI subset for the UE.

In an embodiment, obtaining the predicted TCI subset for the UE based on a current TCI subset for the UE, comprises obtaining the predicted TCI subset for the UE when the current TCI subset for the UE meets a first preset condition.

The current TCI subset is determined to meet a first preset condition based on at least one of the following:

a number of beams that had been used as serving beams for the UE in the current TCI subset is not less than a first preset number;

a switching probability corresponding to a current corresponding serving beam for the UE in a last TCI subset prediction result is not greater than a first preset threshold; and a switching distance between the current corresponding serving beam for the UE and a corresponding serving beam at the time of a last TCI subset update is not less than a first preset distance.

In an embodiment, the obtaining the predicted TCI subset for the UE, comprises obtaining the predicted TCI subset for the UE based on historical measurement report information reported by the UE.

In an embodiment, the obtaining the predicted TCI subset for the UE based on historical measurement report information reported by the UE, comprises determining a switching probability corresponding to each beam in a full beam set based on the historical measurement report information reported by the UE. The obtaining the predicted TCI subset for the UE based on historical measurement report information reported by the UE, comprises determining the predicted TCI subset from the full beam set based on the switching probabilities.

In an embodiment, the determining a switching probability corresponding to each beam in a full beam set based on the historical measurement report information reported by the UE, comprises determining, using at least a prediction model, the switching probability corresponding to each beam in the full beam set based on the historical measurement report information reported by the UE.

In an embodiment, the determining, using at least the prediction model, the switching probability corresponding to each beam in the full beam set based on the historical measurement report information reported by the UE, comprises sampling the historical measurement report information in a preset way to obtain measurement values of each sample beam corresponding to each sampling in the historical measurement report information. The determining, using at least the prediction model, the switching probability corresponding to each beam in the full beam set based on the historical measurement report information reported by the UE, comprises determining, using the prediction model, the switching probability corresponding to each beam in the full beam set based on the measurement values of each sample beam.

In an embodiment, the determining, using the prediction model, the switching probability corresponding to each beam in the full beam set based on the measurement values of each sample beam, comprises obtaining at least one of a vertical orientation angle, a horizontal orientation angle, a beam width, and a beam vector of each sample beam, wherein the beam vector characterizes distribution information of the beams and switching information among the beams. The determining, using the prediction model, the switching probability corresponding to each beam in the full beam set based on the measurement values of each sample beam, comprises determining, using at least the prediction model, the switching probability corresponding to each beam in the full beam set based on at least one of the obtained vertical orientation angle, the horizontal orientation angle, the beam width, and the beam vector, as well as the measurement values of each sample beam.

In an embodiment, the sampling the historical measurement report information in a preset way, comprises at least one of the following:

sampling the historical measurement report information once every preset time interval;

performing the sampling once when a corresponding designated beam for the UE changes for a preset number of times; and performing the sampling once when the switching distance between the corresponding serving beam for the UE and a corresponding serving beam at last sampling is not less than a second preset distance.

In an embodiment, the determining the predicted TCI subset from the full beam set based on the switching probabilities, comprises determining, based on capability information of the UE, a second preset number of beams with the highest switching probability in the full beam set to be the beams in the predicted TCI subset.

In an embodiment, the first preset number is based on size of the TCI subset corresponding to the UE.

In an embodiment, the first preset threshold is based on the switching probabilities corresponding to at least one designated beam in the last TCI subset prediction result.

In an embodiment, the designated beam is a third preset number of beams with the highest switching probability in the last TCI subset prediction result and/or a beam with a switching probability arranged at a preset sequence order in the last TCI subset prediction result.

In an embodiment, the first preset distance is based on the switching distance between each beam in the current TCI subset for the UE and the corresponding serving beam at the time of the last TCI subset update.

In an embodiment, the switching distance is a degree of similarity between a beam vector of each beam in the current TCI subset and a beam vector of the corresponding serving beam at the time of the last TCI subset update.

In an embodiment, the determining a TCI subset corresponding to the UE based on the predicted TCI subset, comprises updating the current TCI subset based on the predicted TCI subset, based on a degree of difference between the current TCI subset and the predicted TCI subset for the UE.

In an embodiment, the updating the current TCI subset based on the predicted TCI subset, based on a degree of difference between the current TCI subset and the predicted TCI subset for the UE, comprises updating the current TCI subset based on the predicted TCI subset when the degree of difference between the current TCI subset and the predicted TCI subset meets a second preset condition. The second preset condition comprising at least one of the following:

the occupancy proportion of beams in the current TCI subset that are identical to beams in the predicted TCI subset to the predicted TCI subset is not greater than a second preset threshold; and a ratio of the sum of the switching probabilities corresponding to all beams in the current TCI subset to the sum of the switching probabilities corresponding to all beams in the predicted TCI subset is not greater than a third preset threshold.

According to embodiments, a base station comprises a transmitter, a processor operable associated with the transmitter. the processor is configured to obtain a predicted transmission configuration indicator (TCI) subset for a user equipment (UE). The processor is configured to determine a TCI subset corresponding to the UE based on the predicted TCI subset.

According to embodiments, a computer readable storage medium is provided. The computer readable storage medium has at least one computer program stored thereon, and the at least one computer program, when executed by a processor, implement at least one of the embodiments.

According to embodiments, a device of a base station comprises at least one transceiver, and at least one processor electrically connected to the at least one transceiver. The at least one processor is configured to obtain at least one measurement report (MR) of a user equipment (UE). The at least one processor is configured to identify a predicted transmission configuration indicator (TCI) subset from a set of TCI states configured to the UE based on the at least one MR of the UE. The at least one processor is configured to determine whether to change an active TCI subset based on the predicted TCI subset. The at least one processor is configured to, in case that it is determined that the active TCI subset is changed, transmit, to the UE, a control signal for activating the predicted TCI subset from the set of TCI states. Each TCI state of the set of TCI states comprises a beam indicator.

In an embodiment, the at least one processor is, to identify the predicted TCI subset, configured to identify a switching probability for a target beam to be switched in the active TCI subset based on the at least one MR. The at least one processor is, to identify the predicted TCI subset, configured to, in case that the switching probability for the target beam is smaller than a first threshold, perform a prediction to identify the predicted TCI subset.

In an embodiment, the at least one processor is, to identify the predicted TCI subset, configured to identify a total number of beams, which had been used as serving beams for the UE switched, in the active TCI subset. The at least one processor is, to identify the predicted TCI subset, configured to, in case that the total number of the beams in the active TCI subset is greater than a second threshold, perform a prediction to identify the predicted TCI subset.

In an embodiment, the at least one processor is, to identify the predicted TCI subset, configured to identify a current target beam to be switched and a last target beam when the active TCI subset is activated. The at least one processor is, to identify the predicted TCI subset, configured to, in case that a similarity metric between a beam vector of the current target beam and a beam vector of the last target beam is greater than a third threshold, perform a prediction to identify the predicted TCI subset.

In an embodiment, the at least one processor is, to determine whether to change the active TCI subset, configured to identify that a proportion of beams included in both of the active TCI subset and the predicted TCI subset to the predicted TCI subset. The at least one processor is, to determine whether to change the active TCI subset, configured to identify whether the proportion is smaller than a fourth threshold or not. In case that the proportion is smaller than the fourth threshold, the active TCI subset is determined to be changed.

In an embodiment, the at least one processor is, to determine whether to change the active TCI subset, configured to identify a ratio of a sum of switching probabilities of the active TCI subset and a sum of switching probabilities of the predicted TCI subset. The at least one processor is, to determine whether to change the active TCI subset, identify whether the ratio is smaller than a fifth threshold or not. In case that the proportion is smaller than the fifth threshold, the active TCI subset is determined to be changed.

In an embodiment, the at least one processor is further configured to transmit, to the UE, a downlink signal for indicating a target beam to be switched within the activated predicted TCI subset.

In an embodiment, the control signal comprises a medium access control (MAC) control element (CE). The downlink signal comprises downlink control information (DCI). The MAC CE includes information for indicating at least one TCI state of the predicted TCI subset to be activated. The DCI includes information for identifying a TCI state from the at least one TCI state. The TCI state indicates the target beam to be switched.

In an embodiment, the set of TCI states is configured based on a radio resource control (RRC) reconfiguration message. The active TCI subset is activated based on a medium access control (MAC) control element (CE) before the predicted TCI subset. Each TCI state of the set of TCI states comprises a quasi-co location (QCL) information for the beam indicator. The beam indicator comprises a channel state information—reference signal (CSI-RS) resource indicator (CRI) or a synchronization signal/physical broadcast channel (SS/PBCH) resource indicator (SRI).

In an embodiment, the predicted TCI subset is identified based on a prediction using an artificial intelligence (AI) model with a movement trajectory of the UE and beams of the set of TCI states.

According to embodiments, a method performed by a base station, the method comprises obtaining at least one measurement report (MR) of a user equipment (UE). The method comprises identifying a predicted transmission configuration indicator (TCI) subset from a set of TCI states configured to the UE based on the at least one MR of the UE. The method comprises determining whether to change an active TCI subset based on the predicted TCI subset. The method comprises, in case that it is determined that the active TCI subset is changed, transmitting, to the UE, a control signal for activating the predicted TCI subset from the set of TCI states. Each TCI state of the set of TCI states comprises a beam indicator.

In an embodiment, the identifying of the predicted TCI subset comprises identifying a switching probability for a target beam to be switched in the active TCI subset based on the at least one MR. The identifying of the predicted TCI subset comprises, in case that the switching probability for the target beam is smaller than a first threshold, performing a prediction to identify the predicted TCI subset.

In an embodiment, the identifying of the predicted TCI subset comprises identifying a total number of beams, which had been used as serving beams for the UE switched, in the active TCI subset. The identifying of the predicted TCI subset comprises, in case that the total number of the beams in the active TCI subset is greater than a second threshold, performing a prediction to identify the predicted TCI subset.

In an embodiment, the identifying of the predicted TCI subset, comprises identifying a current target beam to be switched and a last target beam when the active TCI subset is activated. The identifying of the predicted TCI subset comprises, in case that a similarity metric between a beam vector of the current target beam and a beam vector of the last target beam is greater than a third threshold, performing a prediction to identify the predicted TCI subset.

In an embodiment, the determining of whether to change the active TCI subset, comprises identifying that a proportion of beams included in both of the active TCI subset and the predicted TCI subset to the predicted TCI subset. The determining of whether to change the active TCI subset, comprises identifying whether the proportion is smaller than a fourth threshold or not. In case that the proportion is smaller than the fourth threshold, the active TCI subset is determined to be changed.

In an embodiment, the determining of whether to change the active TCI subset, comprises identifying a ratio of a sum of switching probabilities of the active TCI subset and a sum of switching probabilities of the predicted TCI subset. The determining of whether to change the active TCI subset, comprises identifying whether the ratio is smaller than a fifth threshold or not. In case that the proportion is smaller than the fifth threshold, the active TCI subset is determined to be changed.

In an embodiment, the method further comprises transmitting, to the UE, a downlink signal for indicating a target beam to be switched within the activated predicted TCI subset.

In an embodiment, the control signal comprises a medium access control (MAC) control element (CE). The downlink signal comprises downlink control information (DCI). The MAC CE includes information for indicating at least one TCI state of the predicted TCI subset to be activated. The DCI includes information for identifying a TCI state from the at least one TCI state. The TCI state indicates the target beam to be switched.

In an embodiment, the predicted TCI subset is identified based on a prediction using an artificial intelligence (AI) model with a movement trajectory of the UE and beams of the set of TCI states.

According to embodiments, a non-transitory computer-readable storage medium having stored thereon program instructions. The instructions, when executed by a processor, perform operations including obtaining at least one measurement report (MR) of a user equipment (UE), identifying a predicted transmission configuration indicator (TCI) subset from a set of TCI states configured to the UE based on the at least one MR of the UE, determining whether to change an active TCI subset based on the predicted TCI subset, transmitting, to the UE, a control signal for activating the predicted TCI subset from the set of TCI states in case that it is determined that the active TCI subset is changed. Each TCI state of the set of TCI states comprises a beam indicator.

The computer program code for performing the operations of the present disclosure may be written in one or more programming languages or a combination thereof. The above-mentioned programming languages include object-oriented programming languages-such as Java, Smalltalk, C++, and also include conventional procedural programming language-such as "C" language or similar programming language. The program code can be executed entirely on the user's computer, partly on the user's computer, executed as an independent software package, partly on the user's computer and partly executed on a remote computer, or entirely executed on the remote computer or server. In the case of a remote computer, a remote computer can be connected, directly or indirectly, to the user's computer through any kind of network, including a local area network (LAN) or a wide area network (WAN), or it can be connected to an external computer (for example, using an Internet service provider to pass Internet connection).

The flowcharts and block diagrams in the accompanying drawings illustrate the possible implementation architecture, functions, and operations of the system, method, and computer program product according to various embodiments of the present disclosure. In this regard, each block in the flowchart or block diagram may represent a module, program segment, or part of code, and the module, program segment, or part of code contains one or more executable instructions for realizing the specified logical function. It should also be noted that, in some alternative implementations, the functions marked in the block may also occur in a different order from the order marked in the drawings. For example, two blocks shown in succession can actually be executed substantially in parallel, or they can sometimes be executed in the reverse order, depending on the functions involved. It should also be noted that each block in the block diagram and/or flowchart, and a combination of blocks in the block diagram and/or flowchart, can be implemented by a dedicated hardware-based system that performs the specified function or operation, or it can be realized by a combination of dedicated hardware and computer instructions.

The modules or units involved in the embodiments described in the present application can be implemented in software or hardware. Wherein, the name of the module or unit does not constitute a limitation on the unit itself under certain circumstances. For example, the first position information acquisition module can also be described as "a module for acquiring first position information". Thus, each "module" herein may comprise circuitry, such as processing circuitry.

The above functions herein may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logical device (CPLD) and the like. Each "processor" herein comprises processing circuitry.

In the context, a machine-readable medium may be a tangible medium, which may contain or store a program for use by the instruction execution system, apparatus, or device or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus or device, or any suitable combination of the foregoing. More specific examples of machine-readable storage media would include electrical connections based on one or more wires, portable computer disks, hard drives, random access memory (RAM), read-only memory (ROM), erasable programmable read-only memory (EPROM or flash memory), optical fiber, portable compact disk read only memory (CD-ROM), optical storage device, magnetic storage device, or any suitable combination of the above.

For the apparatuses according to example embodiments, at least one of a plurality of modules can be realized by an AI model. The AI-associated functions can be executed by a non-volatile memory, a volatile memory and a processor.

The processor may include one or more processors. At this time, the one or more processors may be general-purpose processors (e.g., central processing units (CPUs), application processors (APs), etc.), or pure graphics processing units (e.g., graphics processing units (GPUs), visual processing units (VPUs)), and/or AI-specific processors (e.g., neural processing units (NPUs)).

The one or more processors control the processing of input data according to predefined operating rules or artificial intelligence (AI) models stored in non-volatile memory and volatile memory. Predefined operating rules or artificial intelligence models are provided through training or learning.

Here, providing by learning means that the predefined operation rule or AI model with desired characteristics is obtained by applying a learning algorithm to multiple pieces of learning data. The learning may be executed in an apparatus in which the trained AI according to example embodiments is executed, and/or may be implemented by a separate server/system.

The AI model may contain multiple neural network layers. Each layer has a plurality of weight values, and the calculation of one layer is performed by the calculation result of the previous layer and the plurality of weights of the current layer. Examples of neural networks include, but are not limited to, convolutional neural networks (CNN), deep neural networks (DNN), recurrent neural networks (RNN), restricted boltzmann machines (RBM), deep belief networks (DBN), bidirectional recurrent deep neural networks (BRDNN), generative adversarial networks (GAN), and Deep Q-Networks.

A learning algorithm is a method of training a predetermined target devices (e.g., a robot) using a plurality of learning data to cause, allow or control the target device to make determinations or predictions. Examples of the learning algorithm include, but are not limited to, supervised learning, unsupervised learning, semi-supervised learning, or reinforcement learning.

Those skilled in the art can clearly understand that for the convenience and conciseness of the description, the specific method implemented when the computer readable medium described above is executed by an electronic device can refer to the corresponding process in the foregoing method embodiment, which will not be repeated here.

It should be understood that, although various steps in the flowcharts of the drawings are shown in sequence as indicated by arrows, these steps are not necessary to be executed in sequence according to the sequence indicated by arrows. Unless explicitly stated herein, there are no strict limitations on the sequence of execution for those steps, and those steps may be executed in other orders. Also, at least part of the steps in the flowcharts of the drawings may include a plurality of sub-steps or a plurality of stages, and these sub-steps or stages are not necessary to be executed and finished at the same moments but may be executed at different moments. The execution order of these sub-steps or stages is not necessarily to be performed in sequence but may be executed by turns or alternately with other steps or the sub-steps of other steps or at least part of the stages.

While the disclosure has been illustrated and described with reference to various embodiments, it will be understood that the various embodiments are intended to be illustrative, not limiting. It will further be understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A device of a base station, the device comprising:
    at least one transceiver; and
    at least one processor electrically connected to the at least one transceiver,
    wherein the at least one processor is configured to:
    obtain at least one measurement report (MR) of a user equipment (UE);
    identify a predicted transmission configuration indicator (TCI) subset from a set of TCI states configured to the UE based on the at least one MR of the UE;
    determine whether to change an active TCI subset based on the predicted TCI subset; and
    in case that it is determined that the active TCI subset is changed, transmit, to the UE, a control signal for activating the predicted TCI subset from the set of TCI states,
    wherein each TCI state of the set of TCI states comprises a beam indicator.

2. The device of claim 1, wherein the at least one processor is, to identify the predicted TCI subset, configured to:
    identify a switching probability for a target beam to be switched in the active TCI subset based on the at least one MR, and
    in case that the switching probability for the target beam is smaller than a first threshold, perform a prediction to identify the predicted TCI subset.

3. The device of claim 1, wherein the at least one processor is, to identify the predicted TCI subset, configured to:
    identify a total number of beams, which had been used as serving beams for the UE switched, in the active TCI subset, and
    in case that the total number of the beams in the active TCI subset is greater than a second threshold, perform a prediction to identify the predicted TCI subset.

4. The device of claim 1, wherein the at least one processor is, to identify the predicted TCI subset, configured to:
    identify a current target beam to be switched and a last target beam when the active TCI subset is activated, and
    in case that a similarity metric between a beam vector of the current target beam and a beam vector of the last target beam is greater than a third threshold, perform a prediction to identify the predicted TCI subset.

5. The device of claim 1, wherein the at least one processor is, to determine whether to change the active TCI subset, configured to:
    identify that a proportion of beams included in both of the active TCI subset and the predicted TCI subset to the predicted TCI subset, and
    identify whether the proportion is smaller than a fourth threshold or not, and
    wherein, in case that the proportion is smaller than the fourth threshold, the active TCI subset is determined to be changed.

6. The device of claim 1, wherein the at least one processor is, to determine whether to change the active TCI subset, configured to:
    identify a ratio of a sum of switching probabilities of the active TCI subset and a sum of switching probabilities of the predicted TCI subset, and
    identify whether the ratio is smaller than a fifth threshold or not, and
    wherein, in case that the proportion is smaller than the fifth threshold, the active TCI subset is determined to be changed.

7. The device of claim 1, wherein the at least one processor is further configured to transmit, to the UE, a downlink signal for indicating a target beam to be switched within the activated predicted TCI subset.

8. The device of claim 7,
wherein the control signal comprises a medium access control (MAC) control element (CE),
wherein the downlink signal comprises downlink control information (DCI), and
wherein the MAC CE includes information for indicating at least one TCI state of the predicted TCI subset to be activated,
wherein the DCI includes information for identifying a TCI state from the at least one TCI state, and
wherein the TCI state indicates the target beam to be switched.

9. The device of claim 1,
wherein the set of TCI states is configured based on a radio resource control (RRC) reconfiguration message,
wherein the active TCI subset is activated based on a medium access control (MAC) control element (CE) before the predicted TCI subset,
wherein each TCI state of the set of TCI states comprises a quasi-co location (QCL) information for the beam indicator, and
wherein the beam indicator comprises a channel state information—reference signal (CSI-RS) resource indicator (CRI) or a synchronization signal/physical broadcast channel (SS/PBCH) resource indicator (SRI).

10. The device of claim 1, wherein the predicted TCI subset is identified based on a prediction using an artificial intelligence (AI) model with a movement trajectory of the UE and beams of the set of TCI states.

11. A method performed by a base station, the method comprising:
obtaining at least one measurement report (MR) of a user equipment (UE);
identifying a predicted transmission configuration indicator (TCI) subset from a set of TCI states configured to the UE based on the at least one MR of the UE;
determining whether to change an active TCI subset based on the predicted TCI subset; and
in case that it is determined that the active TCI subset is changed, transmitting, to the UE, a control signal for activating the predicted TCI subset from the set of TCI states,
wherein each TCI state of the set of TCI states comprises a beam indicator.

12. The method of claim 11, wherein the identifying of the predicted TCI subset, comprises:
identifying a switching probability for a target beam to be switched in the active TCI subset based on the at least one MR, and
in case that the switching probability for the target beam is smaller than a first threshold, performing a prediction to identify the predicted TCI subset.

13. The method of claim 11, wherein the identifying of the predicted TCI subset, comprises:
identifying a total number of beams, which had been used as serving beams for the UE switched, in the active TCI subset, and
in case that the total number of the beams in the active TCI subset is greater than a second threshold, performing a prediction to identify the predicted TCI subset.

14. The method of claim 11, wherein the identifying of the predicted TCI subset, comprises:
identifying a current target beam to be switched and a last target beam when the active TCI subset is activated, and
in case that a similarity metric between a beam vector of the current target beam and a beam vector of the last target beam is greater than a third threshold, performing a prediction to identify the predicted TCI subset.

15. The method of claim 11, wherein the determining of whether to change the active TCI subset, comprises:
identifying that a proportion of beams included in both of the active TCI subset and the predicted TCI subset to the predicted TCI subset, and
identifying whether the proportion is smaller than a fourth threshold or not, and
wherein, in case that the proportion is smaller than the fourth threshold, the active TCI subset is determined to be changed.

16. The method of claim 11, wherein the determining of whether to change the active TCI subset, comprises:
identifying a ratio of a sum of switching probabilities of the active TCI subset and a sum of switching probabilities of the predicted TCI subset, and
identifying whether the ratio is smaller than a fifth threshold or not, and
wherein, in case that the proportion is smaller than the fifth threshold, the active TCI subset is determined to be changed.

17. The method of claim 11, further comprising:
transmitting, to the UE, a downlink signal for indicating a target beam to be switched within the activated predicted TCI subset.

18. The method of claim 17,
wherein the control signal comprises a medium access control (MAC) control element (CE),
wherein the downlink signal comprises downlink control information (DCI),
wherein the MAC CE includes information for indicating at least one TCI state of the predicted TCI subset to be activated,
wherein the DCI includes information for identifying a TCI state from the at least one TCI state, and
wherein the TCI state indicates the target beam to be switched.

19. The method of claim 11, wherein the predicted TCI subset is identified based on a prediction using an artificial intelligence (AI) model with a movement trajectory of the UE and beams of the set of TCI states.

20. A non-transitory computer-readable storage medium having stored thereon program instructions, the instructions, when executed by a processor, performing operations including:
obtaining at least one measurement report (MR) of a user equipment (UE);
identifying a predicted transmission configuration indicator (TCI) subset from a set of TCI states configured to the UE based on the at least one MR of the UE;
determining whether to change an active TCI subset based on the predicted TCI subset; and
in case that it is determined that the active TCI subset is changed, transmitting, to the UE, a control signal for activating the predicted TCI subset from the set of TCI states,
wherein each TCI state of the set of TCI states comprises a beam indicator.

* * * * *